(12) United States Patent
Sakamoto et al.

(10) Patent No.: US 8,854,559 B2
(45) Date of Patent: Oct. 7, 2014

(54) DISPLAY UNIT AND BARRIER DEVICE

(75) Inventors: Sho Sakamoto, Tokyo (JP); Yuichi Inoue, Kanagawa (JP); Kenichi Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 242 days.

(21) Appl. No.: 13/443,362

(22) Filed: Apr. 10, 2012

(65) Prior Publication Data

US 2012/0268673 A1    Oct. 25, 2012

(30) Foreign Application Priority Data

Apr. 20, 2011  (JP) ................... 2011-094164

(51) Int. Cl.
*G02F 1/1335*    (2006.01)
*G02B 27/22*    (2006.01)
*G02F 1/1347*    (2006.01)

(52) U.S. Cl.
CPC .......... *G02B 27/2214* (2013.01); *G02F 1/1347* (2013.01)
USPC .......................................................... 349/15

(58) Field of Classification Search
USPC .......................................................... 349/15
See application file for complete search history.

(56) References Cited

U.S. PATENT DOCUMENTS

| | | | |
|---|---|---|---|
| 7,965,365 B2* | 6/2011 | Uehara et al. ................ 349/146 |
| 2008/0117365 A1* | 5/2008 | Maeda ............... 349/96 |
| 2010/0033642 A1* | 2/2010 | Kim .................. 349/15 |
| 2010/0085525 A1* | 4/2010 | Chen et al. .................. 349/141 |
| 2010/0245222 A1* | 9/2010 | Cho et al. .................. 345/89 |
| 2011/0043715 A1* | 2/2011 | Ohyama et al. .................. 349/15 |
| 2011/0170026 A1* | 7/2011 | Lin .................. 349/15 |
| 2012/0105748 A1* | 5/2012 | Huang et al. .................. 349/15 |

FOREIGN PATENT DOCUMENTS

JP    2005-086506 A    3/2005

* cited by examiner

*Primary Examiner* — Timothy L Rude
(74) *Attorney, Agent, or Firm* — Wolf, Greenfield & Sacks, P.C.

(57) ABSTRACT

A display unit includes: a display section displaying an image; and a liquid crystal barrier section having a plurality of liquid crystal barriers extending in a predetermined direction, each of the liquid crystal barriers including a liquid crystal layer and a barrier electrode to transmit and block light, wherein the barrier electrode includes a stem portion extending in the predetermined direction, and a plurality of branch portions extending from the stem portion, and the liquid crystal barrier section includes one or more groups of the liquid crystal barriers, the one group of the liquid crystal barriers including the barrier electrodes with patterns different from each other.

16 Claims, 31 Drawing Sheets

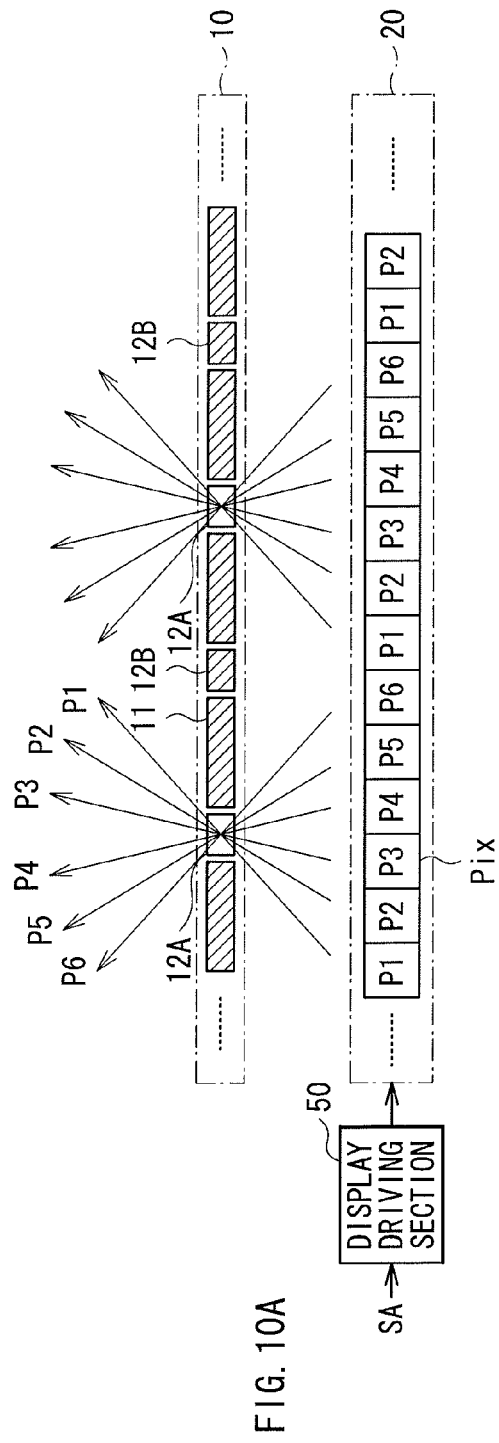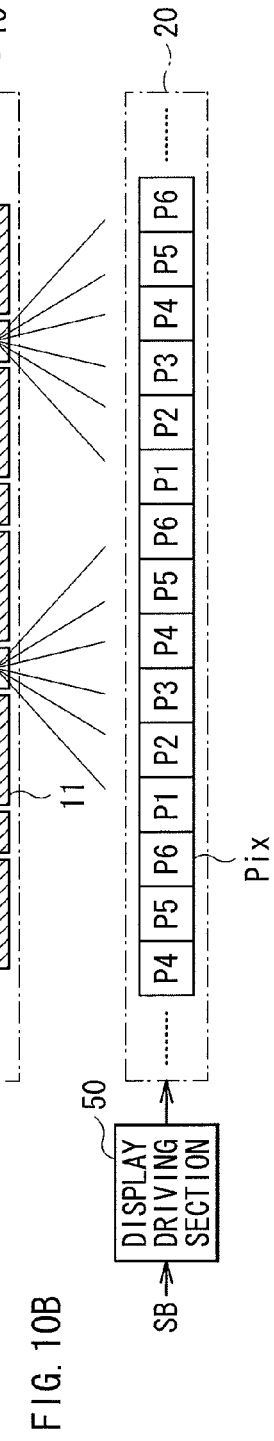
FIG. 10A
FIG. 10B

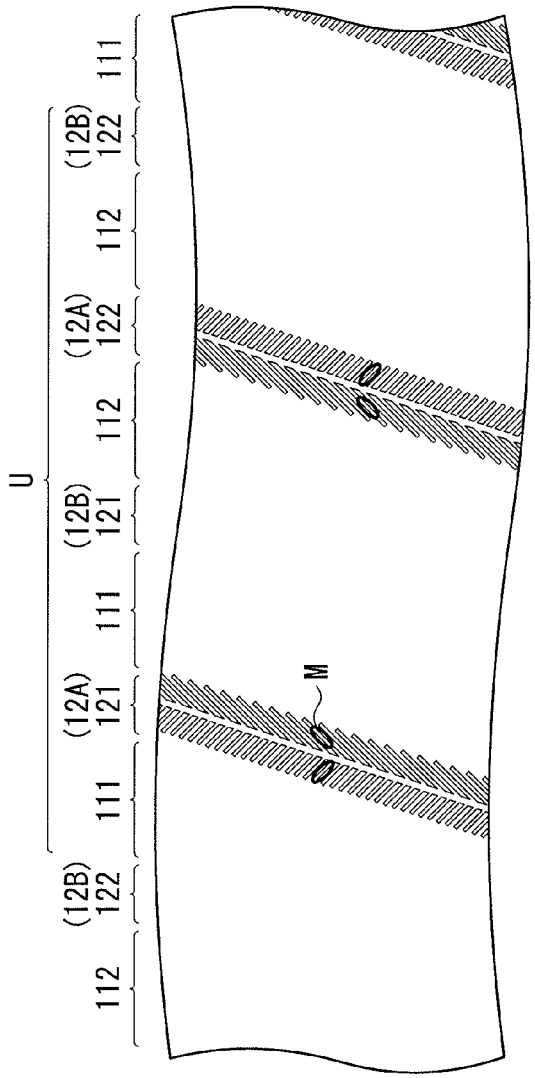
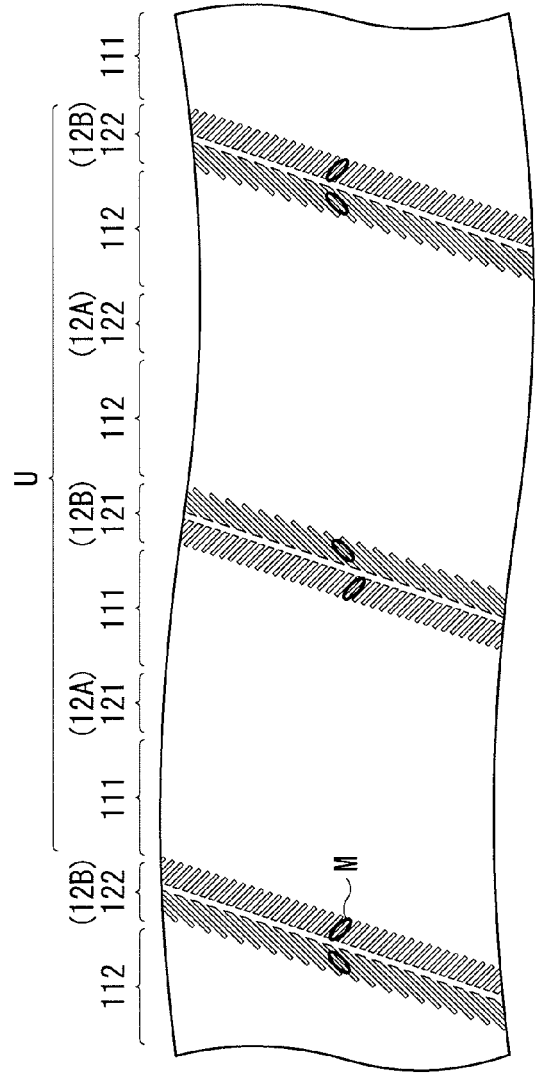
FIG. 11A
FIG. 11B

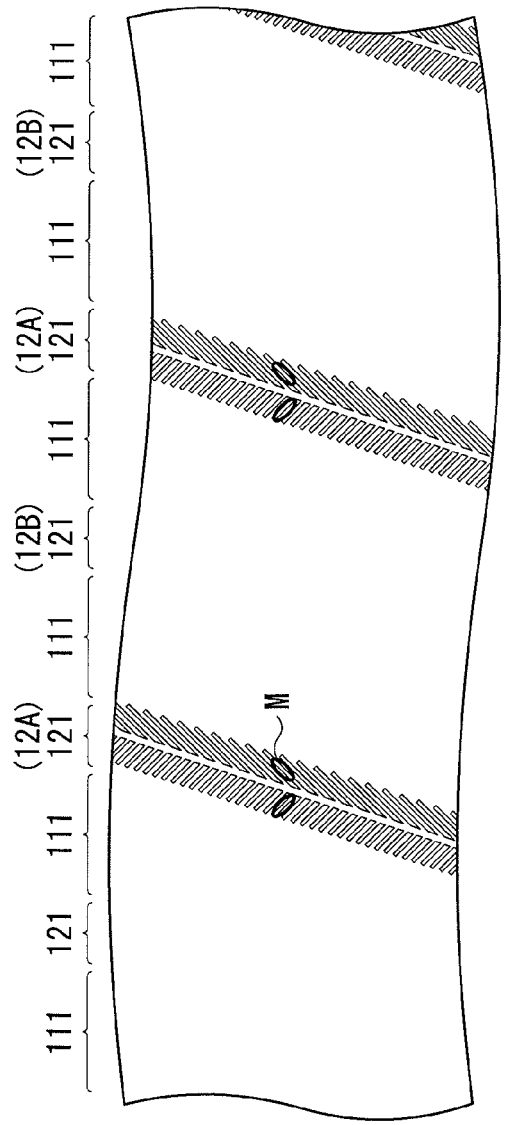
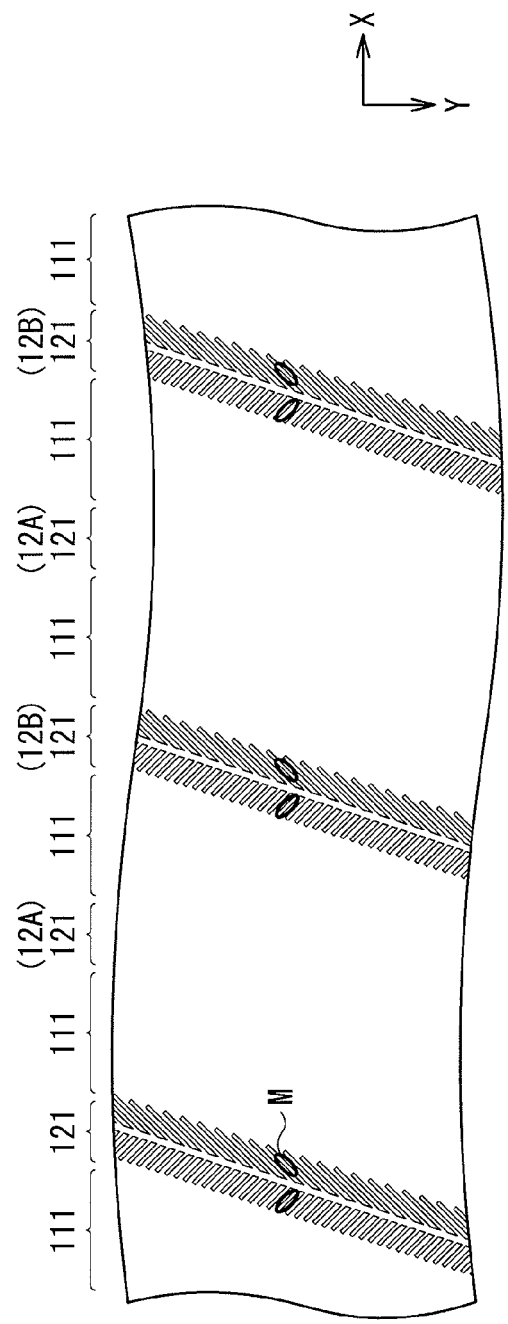
FIG. 18A RELATED ART
FIG. 18B RELATED ART

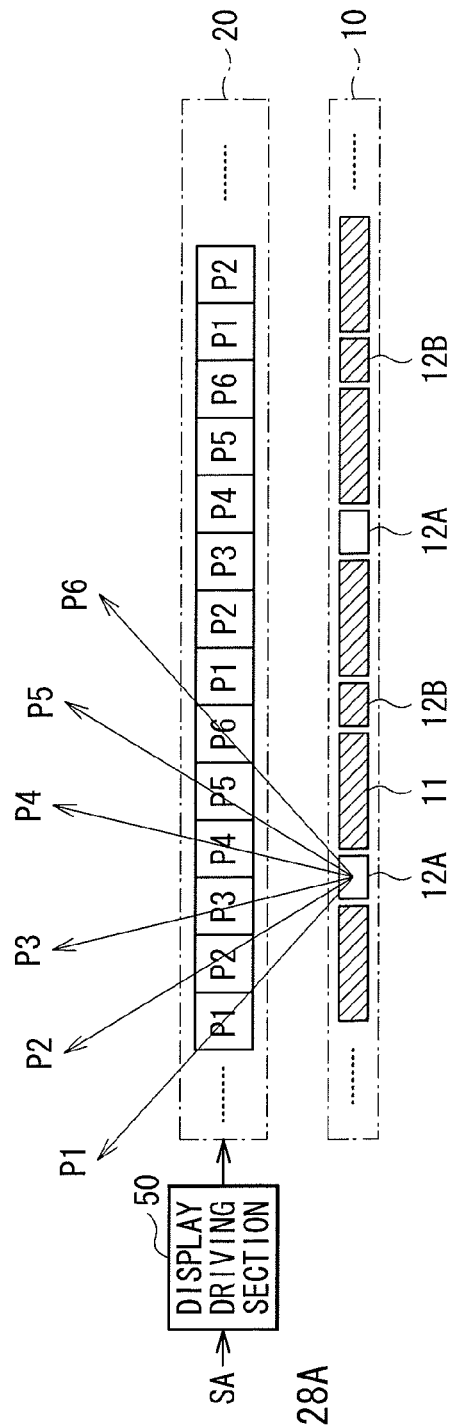
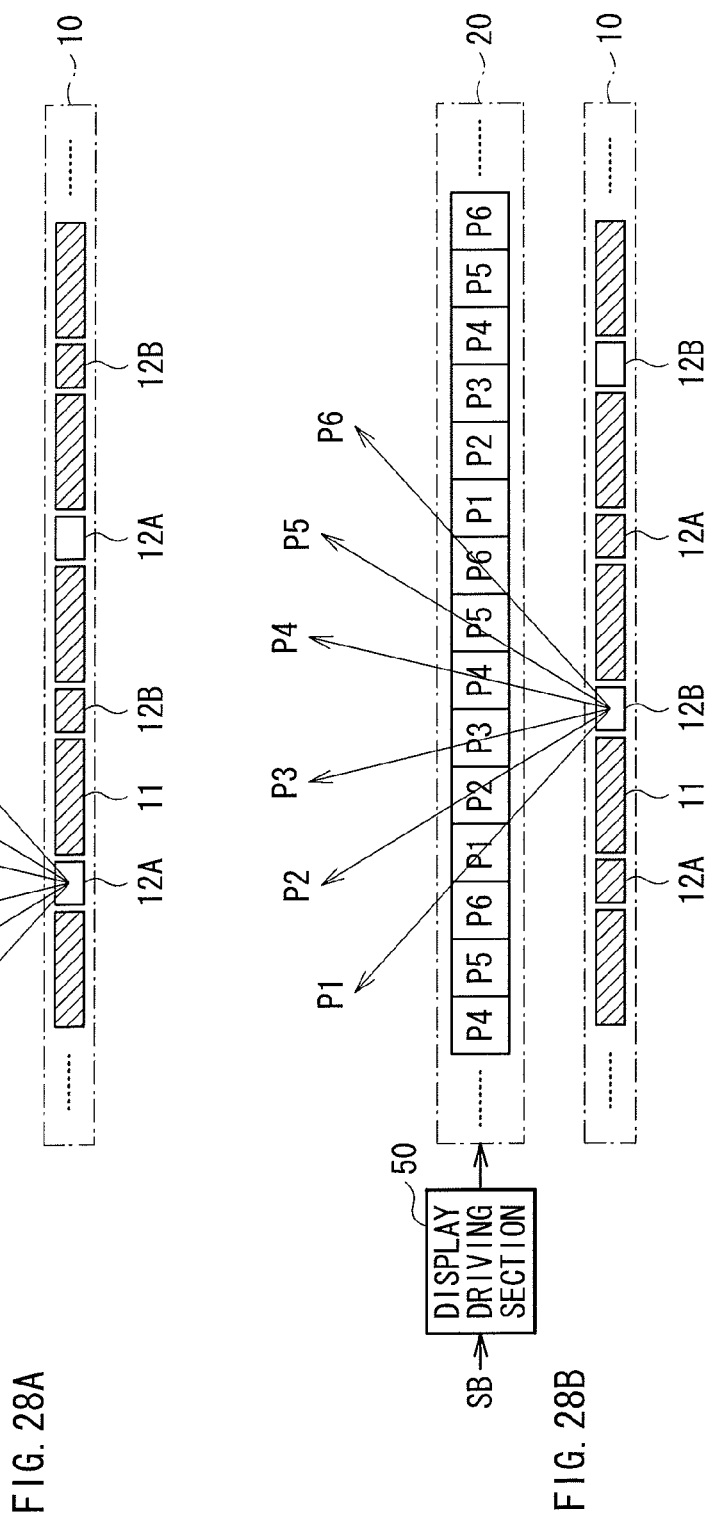
FIG. 28A
FIG. 28B

DISPLAY UNIT AND BARRIER DEVICE

CROSS REFERENCE TO RELATED APPLICATIONS

The present application claims priority to Japanese Patent Application No. JP 2011-094164, filed in the Japan Patent Office on Apr. 20, 2011, the entire contents of which are incorporated herein by reference.

BACKGROUND

The present disclosure relates to a display device of a parallax barrier type that enables a stereoscopic display, and a barrier device for use in such a display device.

In recent years, display devices capable of achieving a stereoscopic display have been attracting attention. The stereoscopic display represents left-eye images and right-eye images with parallax components (different perspectives) with respect to one another, allowing viewers to recognize those images as a stereoscopic image with a stereoscopic effect by viewing each of those images with left and right eyes. Further, display devices have been also developed that ensure to provide more natural stereoscopic images to viewers by displaying three or more images with parallax components with respect to each other.

Such display devices are roughly divided into types needing the use of dedicated eyeglasses and types eliminating the use of dedicated eyeglasses, although viewers may find the use of such dedicated eyeglasses bothersome, and thus the types eliminating the use of dedicated eyeglasses are desirable. Examples of display devices eliminating the use of dedicated eyeglasses include a lenticular lens type, a parallax barrier type, and the like. In the parallax barrier type, for example, a barrier section is provided to be laid on top of a display section, and a plurality of images (perspective images) with parallax components with respect to each other are displayed on the display section at the same time, wherein a viewer sees the images via a slit on the barrier section. This makes viewing images different depending on a relative positional relationship (angle) between a display device and viewpoints of a viewer, allowing the displayed images to be visible as more natural stereoscopic images for a viewer.

Meanwhile, for such display devices utilizing the parallax barrier method, there may be a disadvantage in that moire would arise depending on a positional relationship between a display device and a viewer. Consequently, some proposals for reducing moire have been offered for such display devices. For example, Japanese Unexamined Patent Application Publication No. 2005-86506 proposes a parallax barrier type display device wherein a slit on a barrier section is structured to extend toward an oblique direction of a display screen to reduce crosstalk and moire.

SUMMARY

For such a display device, it is preferable that moire be almost invisible, and further reduction of moire is expected.

It is desirable to provide a display device and a barrier device that are capable of reducing moire.

A display unit according to an embodiment of the present disclosure includes: a display section displaying an image; and a liquid crystal barrier section having a plurality of liquid crystal barriers extending in a predetermined direction, each of the liquid crystal barriers including a liquid crystal layer and a barrier electrode to transmit and block light, wherein the barrier electrode includes a stem portion extending in the predetermined direction, and a plurality of branch portions extending from the stem portion, and the liquid crystal barrier section includes one or more groups of the liquid crystal barriers, the one group of the liquid crystal barriers including the barrier electrodes with patterns different from each other.

A barrier device according to an embodiment of the present disclosure disposed apart from a display face of a display section displaying images and including a plurality of liquid crystal barriers extending in a predetermined direction, each of the liquid crystal barriers including a liquid crystal layer and a barrier electrode to transmit and block light, wherein the barrier electrode includes a stem portion extending in the predetermined direction, and a plurality of branch portions extending from the stem portion, and the liquid crystal barrier section includes one or more groups of the liquid crystal barriers, the one group of the liquid crystal barriers including the barrier electrodes with patterns different from each other.

In the display unit and the barrier device according to an embodiment of the present disclosure, images displayed on the display section are recognized by a viewer by placing a plurality of the liquid crystal barriers into a transmitting state. The barrier electrode is formed to have a stem portion extending in a predetermined direction, and a plurality of branch portions extending from the stem portion. One group of the liquid crystal barriers has barrier electrodes with patterns different from each other.

According to the display unit and the barrier device of an embodiment of the present disclosure, the barrier electrode is formed to have a stem portion extending in a predetermined direction, and a plurality of branch portions extending from the stem portion, which makes it possible to reduce moire.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

FIGS. 10A and 10B are each a pattern diagram showing an operation example of the display section and the liquid crystal barrier section as shown in FIG. 1.

FIGS. 11A and 11B are each another plan view showing a configuration example of a transparent electrode according to the first embodiment of the present disclosure.

FIGS. 18A and 18B are each another plan view showing a configuration example of a transparent electrode according to a comparative example 2.

FIGS. 28A and 28B are each pattern diagram showing an operation example of a stereoscopic display unit according to a modification example.

DETAILED DESCRIPTION OF THE PREFERRED EMBODIMENTS

Figure 1:
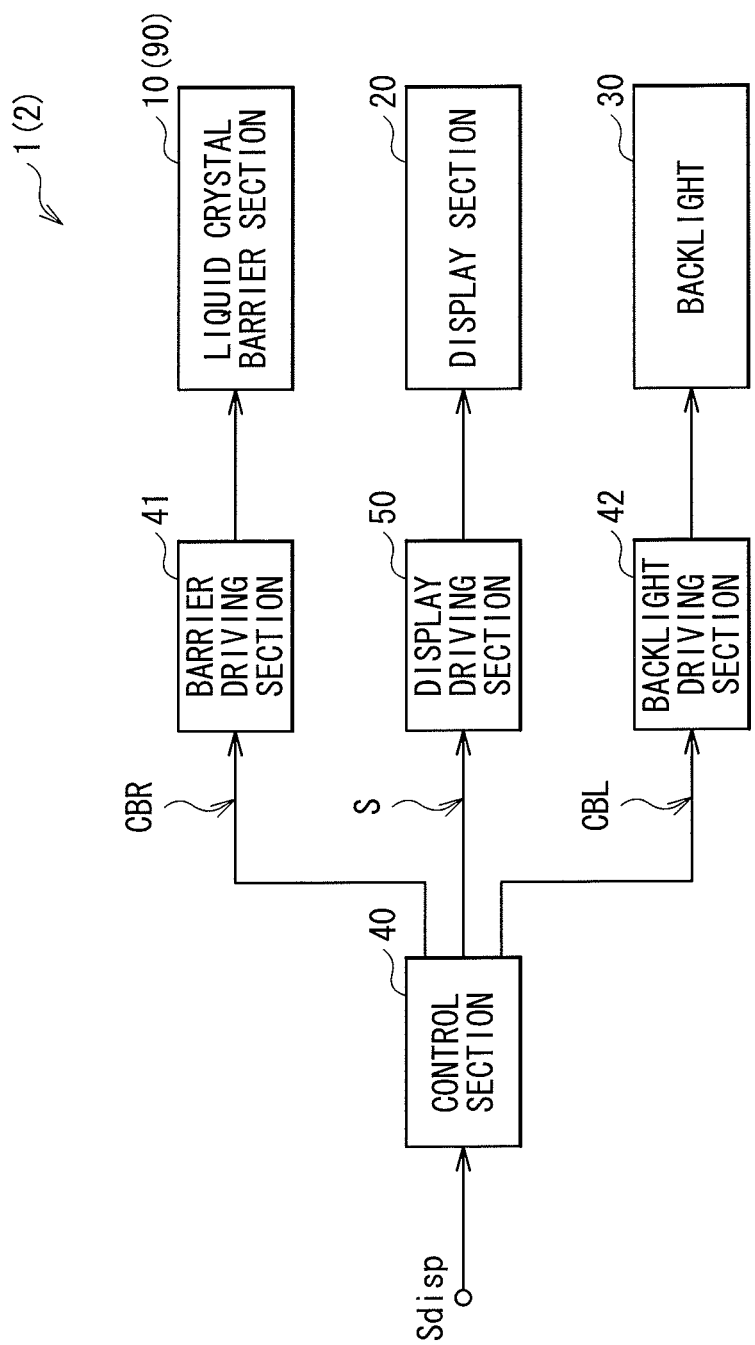
FIG. 1 is a block diagram showing a configuration example of a stereoscopic display unit according to an embodiment of the present disclosure.

Hereinafter, the embodiments of the present disclosure are described in details with reference to the drawings. It is to be noted that the descriptions are provided in order given below.
1. First embodiment
2. Second embodiment 1. First Embodiment Configuration Example Overall Configuration Example FIG. 1 shows a configuration example of a stereoscopic display device according to a first embodiment of the present disclosure. It is to be noted that a barrier device according to an embodiment of the present disclosure is also described in addition because such a barrier device is embodied with this embodiment of the present disclosure. A stereoscopic display device 1 includes a control section 40, a display driving section 50, a display section 20, a backlight driving section 42, a backlight 30, a barrier driving section 41, and a liquid crystal barrier section 10.

The control section 40 is a circuit that provides a control signal to each of the display driving section 50, the backlight driving section 42, and the barrier driving section 41 based on an image signal Sdisp provided externally for controlling these sections to operate in synchronization with each other. Specifically, the control section 40 provides an image signal S based on the image signal Sdisp to the display driving section 50, and delivers a backlight control signal CBL to the backlight driving section 42, while providing a barrier control signal CBR to the barrier driving section 41. With this arrangement, when the stereoscopic display device 1 carries out a stereoscopic display operation, as described later, the image signal S is composed of image signals SA and SB each including a plurality of perspective images (six images in this example).

The display driving section 50 drives the display section 20 on the basis of the image signal S provided from the control section 40. The display section 20 is a liquid crystal display section in this example, performing a display operation in a manner to modulate light emitted from the backlight 30 by driving liquid crystal display elements.

The backlight driving section 42 drives the backlight 30 based on the backlight control signal CBL provided from the control section 40. The backlight 30 has a function to project plane-emitting light to the display section 20. The backlight 30 is composed by the use of, for example, an LED (Light Emitting Diode), a CCFL (Cold Cathode Fluorescent Lamp), and the like.

The barrier driving section 41 drives the liquid crystal barrier section 10 based on the barrier control signal CBR provided from the control section 40. The liquid crystal barrier section 10 puts the light that is projected from the backlight 30 to transmit through the display section 20 in a transmission state (open operation) or a blocking state (closed operation), having a plurality of opening-closing sections 11 and 12 (to be described later) that are composed by the use of a liquid crystal material.

Figure 2A:
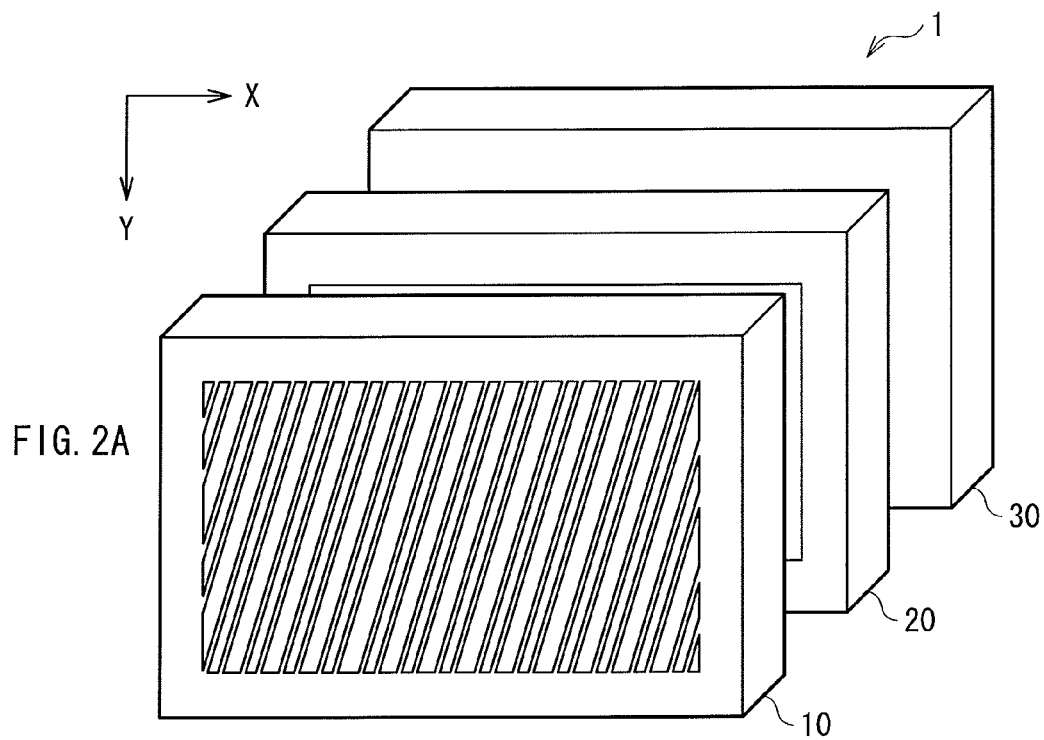
FIGS. 2A and 2B are each an explanatory diagram showing a configuration example of the stereoscopic display device as shown in FIG. 1.
Figure 2B:
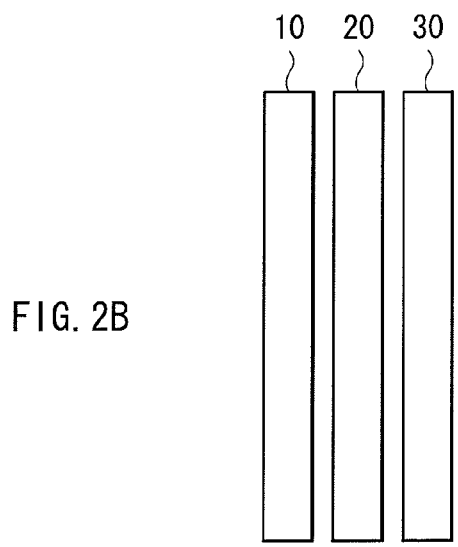

FIGS. 2A and 2B each show a configuration example of a relevant part on the stereoscopic display device 1, wherein FIG. 2A denotes an exploded perspective view of the stereoscopic display device 1, while FIG. 2B denotes a side view of the stereoscopic display device 1. As shown in FIGS. 2A and 2B, on the stereoscopic display device 1, each of these parts is disposed in the order of the backlight 30, the display section 20, and the liquid crystal barrier section 10. That is, the light projected from the backlight 30 reaches a viewer via the display section 20 and the liquid crystal barrier section 10.

(Display Driving Section 50 and Display Section 20).

Figure 3:
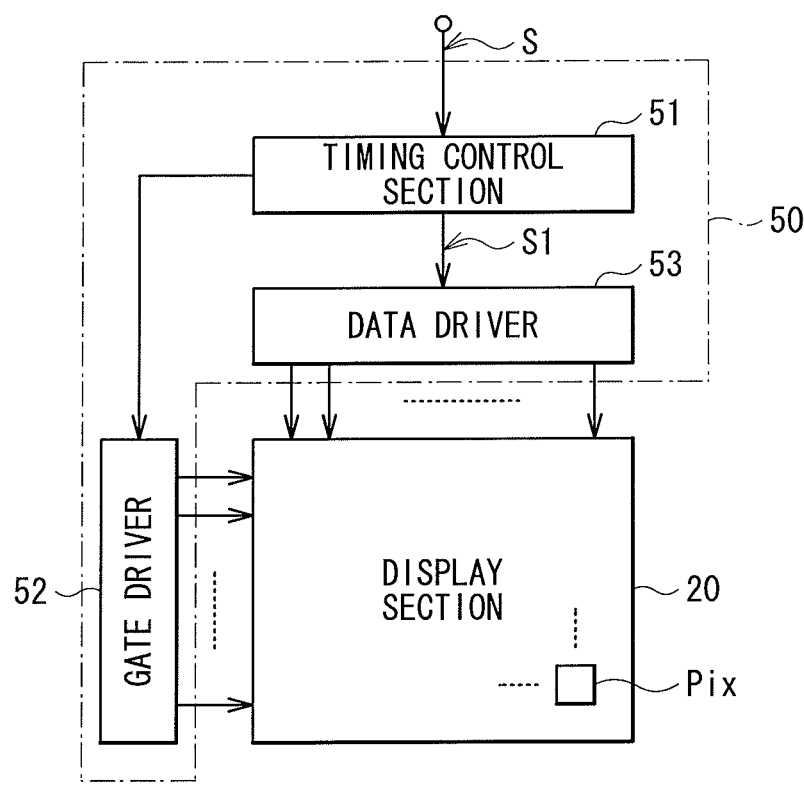
FIG. 3 is a block diagram showing a configuration example of a display driving section and a display section as shown in FIG. 1.

FIG. 3 shows an example of a block diagram for the display driving section 50 and the display section 20. The display driving section 50 includes a timing control section 51, a gate driver 52, and a data driver 53. The timing control section 51 controls a drive timing for the gate driver 52 and the data driver 53, while providing the image signal S delivered from the control section 40 to the data driver 53 as an image signal 51. The gate driver 52 sequentially selects pixels Pix within the display section 20 for each row for line-sequential scanning under a timing control performed by a timing control section 51. The data driver 53 provides a pixel signal based on the image signal S1 to each of the pixels Pix within the display section 20. Specifically, the data driver 53 generates the pixel signal in an analog signal form by performing D/A (digital/analog) conversion based on the image signal S1, providing the resultant pixel signal to each of the pixels Pix.

Figure 4A:
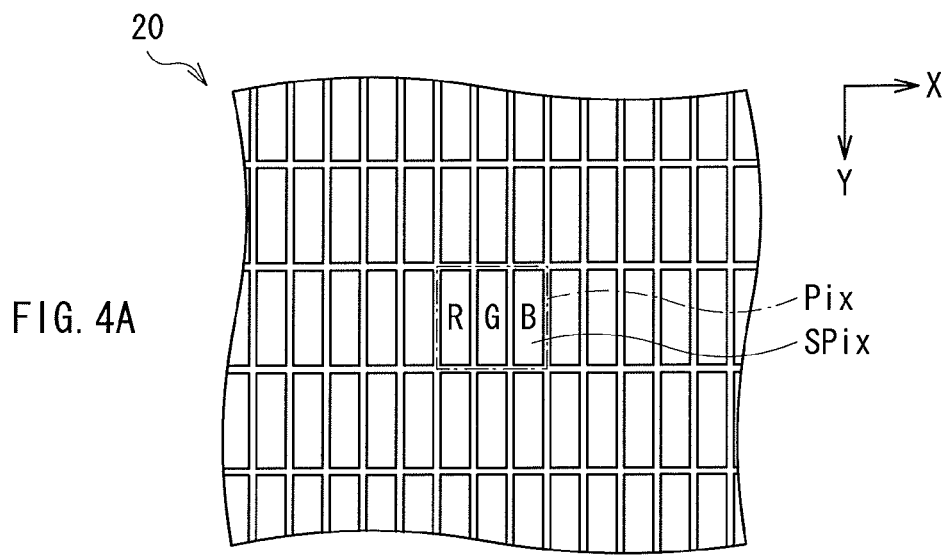
FIGS. 4A and 4B are each an explanatory diagram showing a configuration example of the display section as shown in FIG. 1.
Figure 4B:
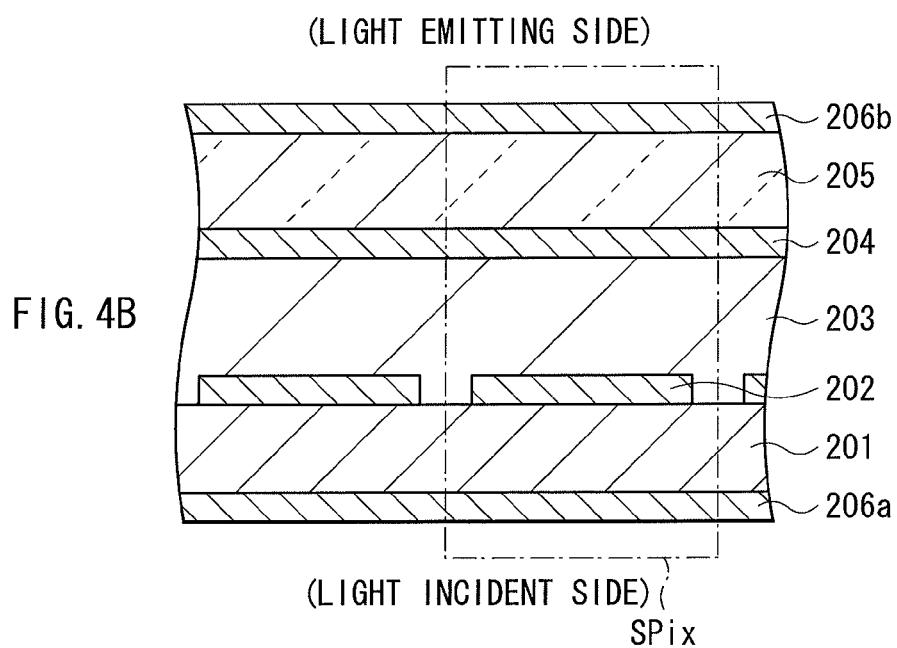

FIGS. 4A and 4B each show a configuration example of the display section 20, wherein FIG. 4A denotes an array of pixels, while FIG. 4B denotes a cross-sectional structure of the display section 20.

As shown in FIG. 4A, pixels Pix are arranged in a matrix pattern on the display section 20. Each of the pixels Pix has three sub-pixels SPix corresponding to red color (R), green color (G), and blue color (B), respectively. Among the sub-pixels SPix, so-called a black matrix is formed, thereby shielding the light that is projected from the backlight 30 to come into the display section 20. This makes it difficult to give rise to a color mixture of red color (R), green color (G), and blue color (B) on the display section 20.

As shown in FIG. 4B, the display section 20 seals a liquid crystal layer 203 between a drive substrate 201 and a counter substrate 205. The drive substrate 201 forms a pixel driver circuit (not shown in the figure) including the above-described TFT element Tr, wherein a pixel electrode 202 is arranged for each of the sub-pixels SPix on the drive substrate 201. On the counter substrate 205, a color filter (not shown in the figure) each corresponding to red color (R), green color (G), and blue color (B), as well as the black matrix (not shown in the figure) is formed, and further on the surface of the liquid crystal layer 203 side, a counter electrode 204 is arranged as an electrode common to each of the sub-pixels SPix. At the light incident side (backlight 30 side in this case) and the light emitting side (liquid crystal barrier section 10 side in this case) on the display section 20, polarizers 206a and 206b are attached to one another to become a cross-nicol or parallel-nicol with each other.

Figure 5:
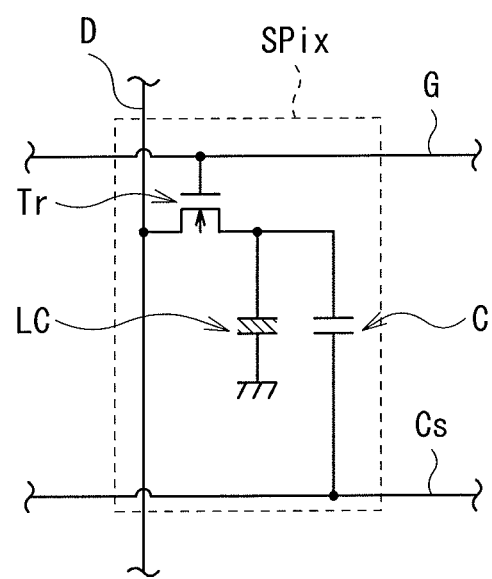
FIG. 5 is a circuit diagram showing a configuration example of a sub-pixel as shown in FIGS. 4A and 4B.

FIG. 5 shows an example of a circuit diagram for the sub-pixels SPix. The sub-pixel SPix includes a TFT (Thin Film Transistor) element Tr, a liquid crystal element LC, and a holding capacitor element Cap. The TFT element Tr is composed of, for example, a MOS-FET (Metal Oxide Semiconductor-Field Effect Transistor) with a gate connected to a gate line G, a source connected to a data line D, and a drain connected to a first end of the liquid crystal element LC and a first end of the holding capacitor element Cap, respectively. For the liquid crystal element LC, the first end is connected to the drain of the TFT element Tr, while a second end is grounded. For the holding capacitor element Cap, the first end is connected to the drain of the TFT element Tr, while a second end is connected to a holding capacitor line Cs. The gate line G is connected to the gate driver 52, and the data line D is connected to the data driver 53.

(Liquid Crystal Barrier Section 10)

Figure 6A:
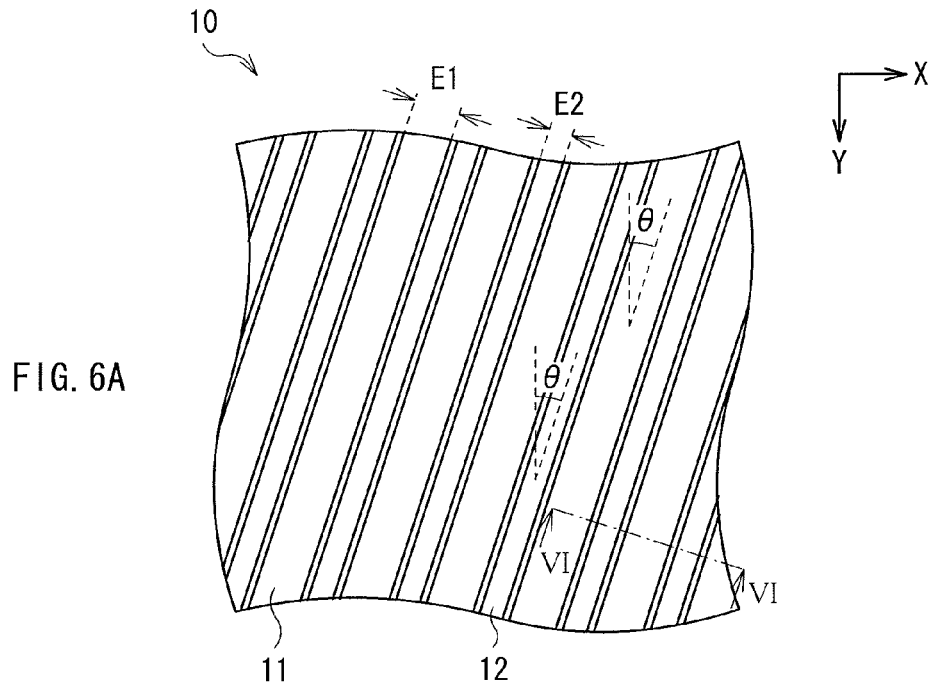
FIGS. 6A and 6B are each an explanatory diagram showing a configuration example of a liquid crystal barrier section as shown in FIG. 1.
Figure 6B:
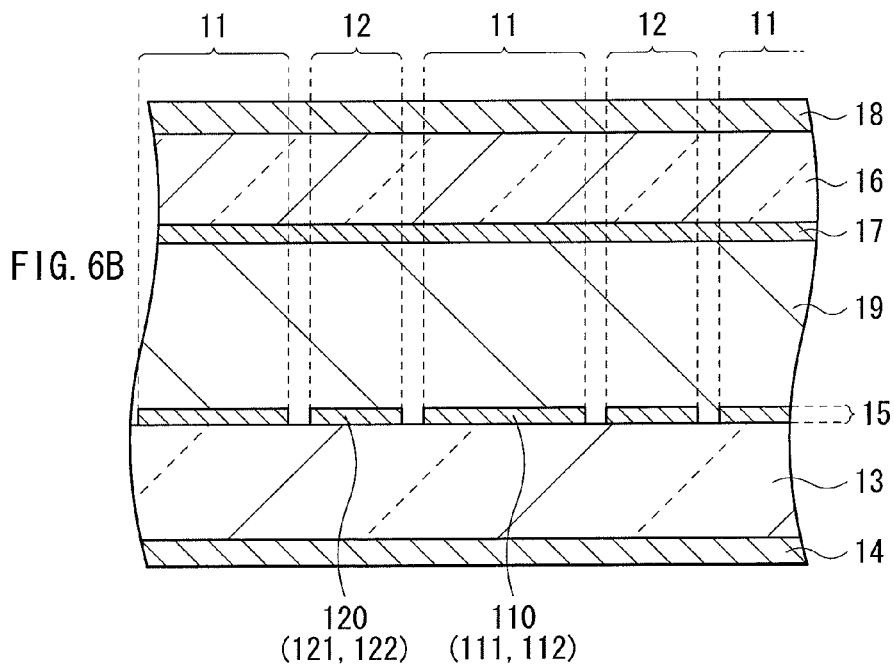

FIGS. 6A and 6B shows a configuration example of the liquid crystal barrier section 10, wherein FIG. 6A denotes an arrangement configuration of an opening-closing section on the liquid crystal barrier section 10, while FIG. 6B denotes a cross-sectional structure in the VI-VI arrow-view direction on the liquid crystal barrier section 10 shown in FIG. 6A. The liquid crystal barrier section 10 carries out a normally black operation. That is, the liquid crystal barrier section 10 blocks light in a non-driven state.

The liquid crystal barrier section 10, which is so-called a parallax barrier, has a plurality of opening-closing sections (liquid crystal barriers) 11 and 12 to transmit or block light as shown in FIG. 6A. These opening-closing sections 11 and 12 perform different operation depending on whether the stereoscopic display device 1 carries out either a normal display (two-dimensional display) or a stereoscopic display. Specifically, as described later, the opening-closing sections 11 are placed into an open state (transmission state) during a normal display, and are placed into an closed state (blocking state) during a stereoscopic display. As described later, the opening-closing sections 12 are placed into an open state (transmission state) during a normal display, and perform a switching operation on a time-division basis during a stereoscopic display.

These opening-closing sections 11 and 12 are provided to extend in one direction (for example, a direction forming a predetermined angle θ from a vertical direction Y) on the X-Y plane. The angle θ may be set at 18 degrees for example. A width E1 of the opening-closing section 11 and a width E2 of the opening-closing section 12 are different from each other, wherein a relation of, for example, E1>E2 is maintained in this case. However, a magnitude relation in the width of the opening-closing sections 11 and 12 is not limited thereto, and a relation of E1<E2 or E1=E2 may be also permitted alternatively. Such opening-closing sections 11 and 12 include a liquid crystal layer (liquid crystal layer 19 to be described later), performing a switching operation depending on a drive voltage provided to the liquid crystal layer 19.

As shown in FIG. 6B, the liquid crystal barrier section 10 includes the liquid crystal layer 19 between a transparent substrate 13 and a transparent substrate 16 that are made of, for example, a glass. In this example, the transparent substrate 13 is disposed at the light incident side, and the transparent substrate 16 is disposed at the light emitting side. Transparent electrode layers 15 and 17 that are made of, for example, ITO are formed respectively at the surface of the liquid crystal layer 19 side on the transparent substrate 13 and at the surface of the liquid crystal layer 19 side on the transparent substrate 16. At the light incident side on the transparent substrate 13 and the light emitting side on the transparent substrate 16, polarizers 14 and 18 are attached to one another. For the liquid crystal layer 19, a VA (Vertical Alignment) mode liquid crystal is used for example.

The transparent electrode layer 15 has a plurality of transparent electrodes 110 (transparent electrodes 111 and 112) and 120 (transparent electrodes 121 and 122). The transparent electrode layer 17 is provided as an electrode common to each of the opening-closing sections 11 and 12. In this example, 0 V is applied to the transparent electrode layer 17. The transparent electrode 110 on the transparent electrode layer 15 and a portion corresponding to that transparent electrode 110 on the transparent electrode layer 17 compose the opening-closing sections 11. Similarly, the transparent electrode 120 on the transparent electrode layer 15 and a portion corresponding to that transparent electrode 120 on the transparent electrode layer 17 compose the opening-closing sections 12. At the liquid crystal layer 19 side on each of these transparent electrode layers 15 and 17, an alignment film that is not shown in the figure is formed.

The polarizers 14 and 18 control a polarization direction each of incoming light and outgoing light to/from the liquid crystal layer 19. A transmission axis of the polarizer 14 is disposed in a horizontal direction X for example, while a transmission axis of the polarizer 18 is disposed in a vertical direction Y for example. That is, each transmission axis of the polarizers 14 and 18 is disposed to be orthogonal to one another.

With such an arrangement, on the liquid crystal barrier section 10, a voltage is selectively applied to the transparent electrodes 110 and 120, and the liquid crystal layer 19 is put into a liquid crystal alignment in accordance with the applied voltage, thereby making it possible to perform a switching operation for each of the opening-closing sections 11 and 12. Specifically, when a voltage is applied to the transparent electrode layer 15 (transparent electrodes 110 and 120) and the transparent electrode layer 17, as the potential difference becomes large, the light transmittance on the liquid crystal layer 19 increases, resulting in the opening-closing sections 11 and 12 being placed into a transmission state (open state). On the other hand, as the potential difference becomes small, the light transmittance on the liquid crystal layer 19 decreases, resulting in the opening-closing sections 11 and 12 being placed into a blocking state (closed state).

On the liquid crystal barrier section 10, a plurality of the opening-closing sections 12 form groups, and a plurality of the opening-closing sections 12 belonging to the same group perform opening and closing actions at the same timing in carrying out a stereoscopic display. Hereinafter, groups of the opening-closing sections 12 will be described.

Figure 7:
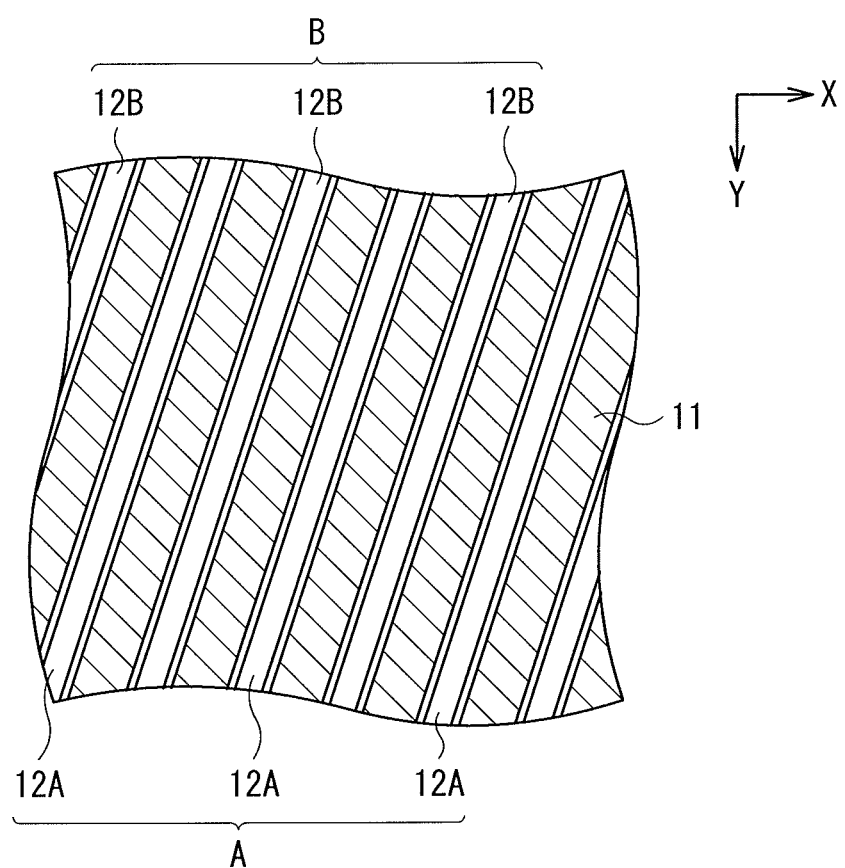
FIG. 7 is an explanatory diagram showing a group configuration example of opening-closing sections as shown in FIGS. 6A and 6B.

FIG. 7 shows a group configuration example of the opening-closing sections 12. In this example, the opening-closing sections 12 form two groups. Specifically, a plurality of the opening-closing sections 12 that are arranged side by side compose a group A and a group B alternately. It is to be noted that opening-closing sections 12A are used as appropriate as a generic term of the opening-closing sections 12 belonging to the group A, and similarly opening-closing sections 12B are used as appropriate as a generic term of the opening-closing sections 12 belonging to the group B.

Figure 8:
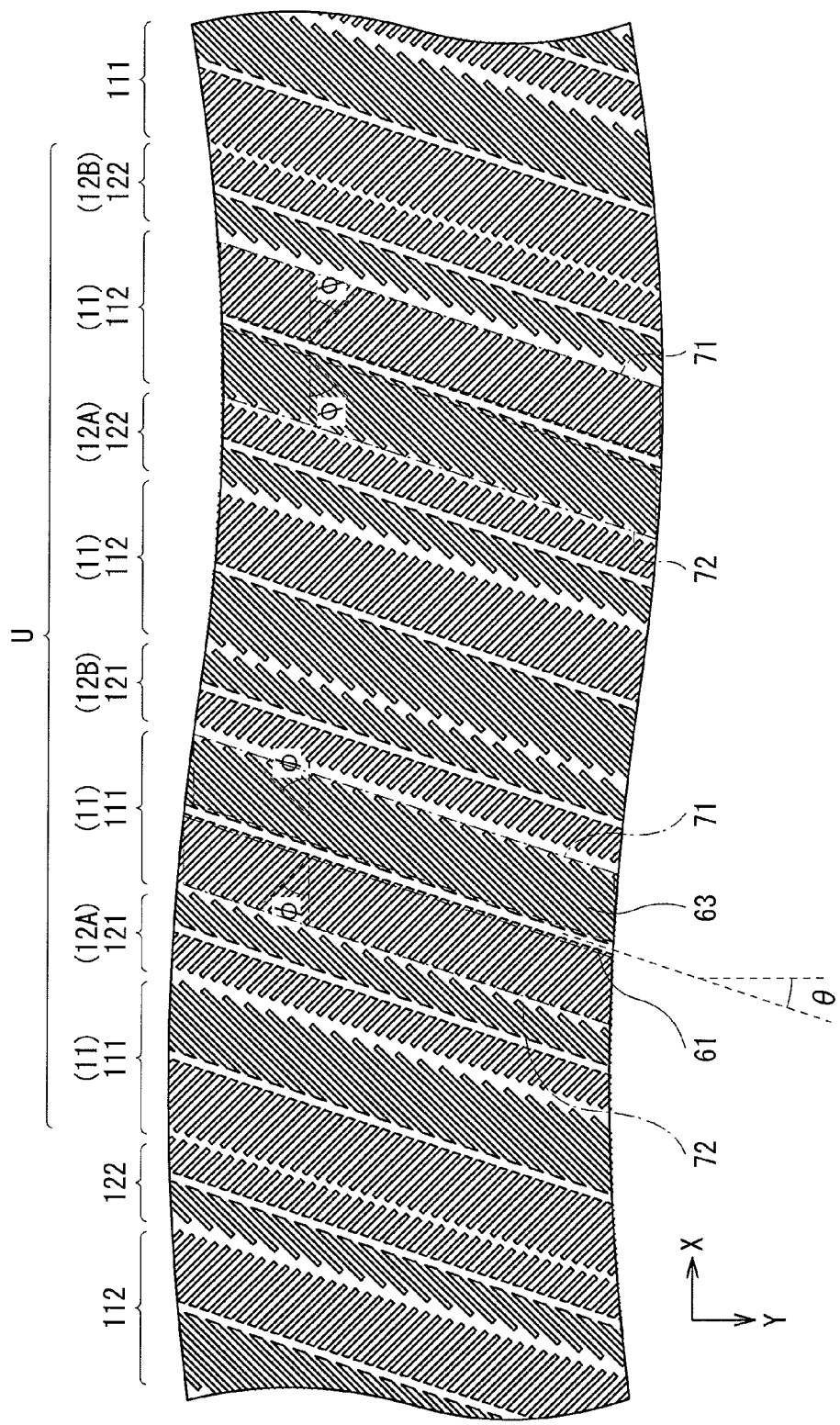
FIG. 8 is a plan view showing a configuration example of a transparent electrode according to a first embodiment of the present disclosure.

FIG. 8 shows a configuration example of the transparent electrode layer 15. Each of the transparent electrodes 111 and 112 as well as the transparent electrodes 121 and 122 has a stem portion 61 and branch portions 63. The stem portion 61 extends in the same direction as the extending direction of the opening-closing sections 11 and 12 (direction forming a predetermined angle θ from a vertical direction Y). On each of the transparent electrodes 111 and 112 as well as the transparent electrodes 121 and 122, there are provided two branch regions 71 and 72 that are separated by the stem portion 61. It is to be noted that FIG. 8 shows the branch regions 71 and 72 only for the transparent electrodes 111 and 112 for convenience of explanation, although this is also true for the transparent electrodes 121 and 122.

The branch portions 63 are formed to extend from the stem portion 61 in each of the branch regions 71 and 72. A line width of each of the branch portions 63 is equal to each other in the branch regions 71 and 72. Similarly, a spacing interval (slit width) of each of the branch portions 63 is also equal to each other in the branch regions 71 and 72. The branch portions 63 in each of the branch regions 71 and 72 extend in the same direction within each region, while extending in the different direction for each branch region. Specifically, the extending direction of the branch portions 63 in the branch region 71 and the extending direction of the branch portions 63 in the branch region 72 are axisymmetric with respect to the vertical direction Y as an axis.

For the transparent electrode 111 and the transparent electrode 112 in the opening-closing sections 11, the extending direction of the branch portions 63 is different from each other. In concrete terms, the branch portions 63 in the branch region 71 extend in the direction rotated at a predetermined angle φ counterclockwise from the horizontal direction X for the transparent electrode 111, while extending in the direction rotated at a predetermined angle φ clockwise from the horizontal direction X for the transparent electrode 112. Further, the branch portions 63 in the branch region 72 extend in the direction rotated at a predetermined angle φ clockwise from the horizontal direction X for the transparent electrode 111, while extending in the direction rotated at a predetermined angle φ counterclockwise from the horizontal direction X for the transparent electrode 112. It is desirable that the angle φ be 45 degrees for example.

Similarly, for the transparent electrode 121 and the transparent electrode 122 in the opening-closing sections 12, the extending direction of the branch portions 63 is different from each other. In concrete terms, the branch portions 63 in the branch region 71 extend in the direction rotated at a predetermined angle φ counterclockwise from the horizontal direction X for the transparent electrode 121, while extending in the direction rotated at a predetermined angle φ clockwise from the horizontal direction X for the transparent electrode 122. Further, the branch portions 63 in the branch region 72 extend in the direction rotated at a predetermined angle φ clockwise from the horizontal direction X for the transparent electrode 121, while extending in the direction rotated at a predetermined angle φ counterclockwise from the horizontal direction X for the transparent electrode 122.

As shown in FIG. 8, on the transparent electrode layer 15, the transparent electrodes 111 and 112 as well as the transparent electrodes 121 and 122 are disposed along the horizontal direction X in the order of the transparent electrodes 111, 121, 111, 121, 112, 122, 112, and 122, while being disposed repeatedly with these eight transparent electrodes as a unit U. Among eight transparent electrodes composing the unit U, the second transparent electrode 121 and the sixth transparent electrode 122 compose the opening-closing section 12A, and the fourth transparent electrode 121 and the eighth transparent electrode 122 compose the opening-closing section 12B. The remaining transparent electrodes (the first and the third transparent electrodes 111, and the fifth and the seventh transparent electrodes 112) compose the opening-closing section 11. In such a manner, on the liquid crystal barrier section 10, the opening-closing sections 11 and the opening-closing sections 12 (opening-closing sections 12A and 12B) are disposed alternately.

The barrier driving section 41 drives a plurality of the opening-closing sections 12 belonging to the same group to perform open/closed operations at the same timing in carrying out a stereoscopic display. Specifically, as described later, the barrier driving section 41 drives a plurality of the opening-closing sections 12A belonging to the group A and a plurality of the opening-closing sections 12B belonging to the group B to perform open/closed operations alternately on a time-division basis.

Figure 9A:
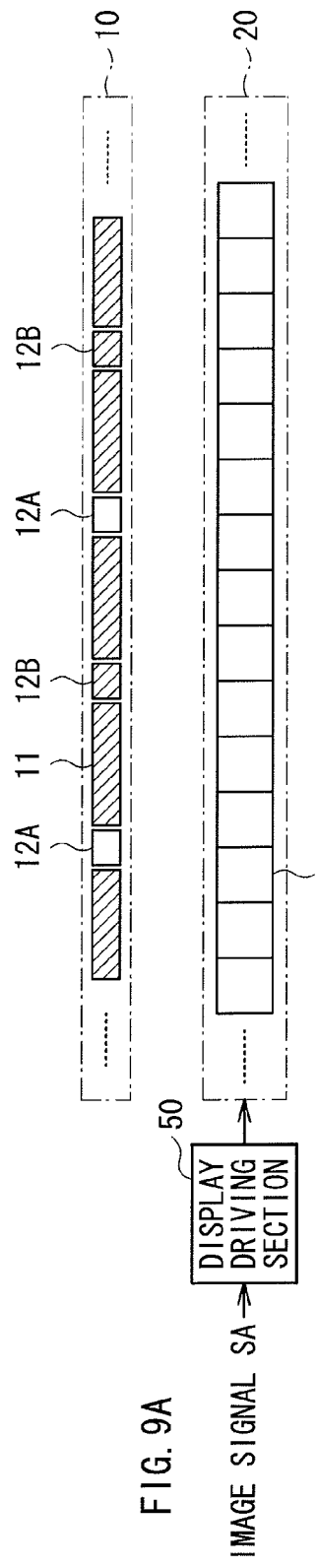
FIGS. 9A to 9C are each a pattern diagram showing a relationship between the display section and the liquid crystal barrier section as shown in FIG. 1.
Figure 9B:
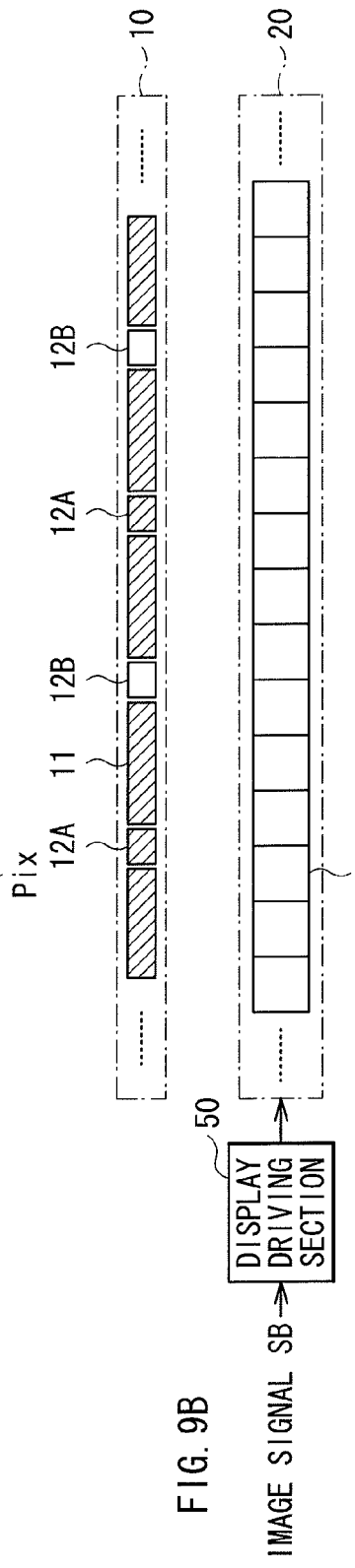
Figure 9C:
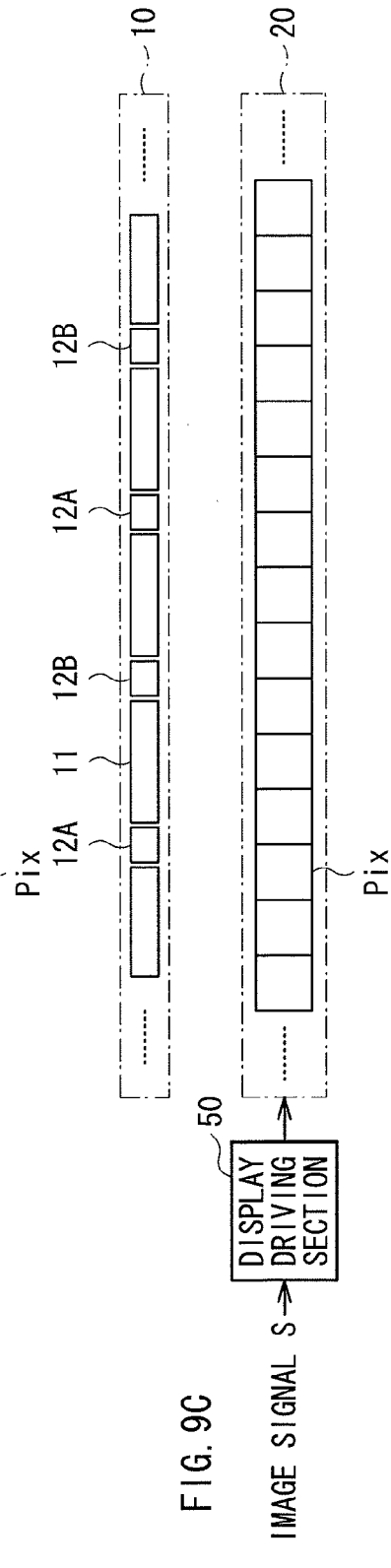

FIGS. 9A to 9C show status of the liquid crystal barrier section 10 in carrying out a stereoscopic display and a normal display (two-dimensional display) as a pattern diagram using a cross-sectional surface structure, wherein FIG. 9A denotes a state in performing a stereoscopic display, and FIG. 9B denotes another state in performing a stereoscopic display, while FIG. 9C denotes a state in performing a normal display. In this example, the opening-closing sections 12A are provided at a rate of one piece per six pixels Pix on the display section 20. In the same way, the opening-closing sections 12B are provided at a rate of one piece per six pixels Pix on the display section 20 as well. In FIGS. 9A to 9C, the opening-closing sections in which light is blocked among the opening-closing sections 11, 12A, and 12B on the liquid crystal barrier section 10 are marked with oblique lines.

In carrying out a stereoscopic display, image signals SA and SB are alternately supplied to the display driving section 50, and the display section 20 performs a display operation based on such supplied image signals. At this time, on the liquid crystal barrier section 10, the opening-closing sections 12 (opening-closing sections 12A and 12B) perform opening/closing actions on a time-division basis, while the opening-closing sections 11 are kept in a closed state (blocking state). In concrete terms, when the image signal SA is provided, as shown in FIG. 9A, the opening-closing sections 12A are put in an open state, while the opening-closing sections 12B are put in an closed state. On the display section 20, as described later, six pixels Pix that are arranged adjacently to each other at positions corresponding to the opening-closing sections 12A carry out a display action corresponding to six perspective images included in the image signal SA. Consequently, as described later, a viewer sees different perspective images with a left eye and a right eye for example, feeling displayed images as stereoscopic images. Similarly, when the image signal SB is provided, as shown in FIG. 9B, the opening-closing sections 12B are put in an open state, while the opening-closing sections 12A are put in a closed state. On the display section 20, as described later, six pixels Pix that are arranged adjacently to each other at positions corresponding to the opening-closing sections 12B carry out a display action corresponding to six perspective images included in the image signal SB. Consequently, as described later, a viewer sees different perspective images with a left eye and a right eye for example, feeling displayed images as stereoscopic images. On the stereoscopic display unit 1, images are represented by alternately opening the opening-closing sections 12A and the opening-closing sections 12B in such a manner, thereby allowing the resolution of the display unit to be improved as described later.

In carrying out a normal display (two-dimensional display), on the liquid crystal barrier section 10, both of the opening-closing sections 11 and the opening-closing sections 12 (opening-closing sections 12A and 12B) are kept in an open state (transmitting state) as shown in FIG. 9C. As a result, a viewer is allowed to see normal two-dimensional images as they are that are displayed on the display section 20 based on the image signal S.

Thereupon, the transparent electrodes 111, 112, 121, and 122 correspond to a specific example of a "barrier electrode" in one embodiment of the present disclosure. The opening-closing sections 11 and 12 correspond to a specific example of a "liquid crystal barrier" in one embodiment of the present disclosure. The opening-closing sections 12 correspond to a specific example of a "first group of liquid crystal barrier" in one embodiment of the present disclosure, while the opening-closing sections 11 correspond to a specific example of a "second group of liquid crystal barrier" in one embodiment of the present disclosure. The branch portions 63 at the branch region 71 correspond to a specific example of a "first branch portion" in one embodiment of the present disclosure, while the branch portions 63 at the branch region 72 correspond to a specific example of a "second branch portion" in one embodiment of the present disclosure.

[Operation and Action]

Subsequently, the description is provided on the operation and action of the stereoscopic display unit 1 according to the embodiment of the present disclosure.

(Overview of Overall Operation)

First, the overview of overall operation for the stereoscopic display device 1 is described with reference to FIG. 1. The control section 40 provides the control signal to each of the display driving section 50, the backlight driving section 42, and the barrier driving section 41 based on the image signal Sdisp provided externally for controlling these sections to operate in synchronization with each other. The backlight driving section 42 drives the backlight 30 based on the backlight control signal CBL provided from the control section 40. The backlight 30 projects plane-emitting light to the display section 20. The display driving section 50 drives the display section 20 based on the image signal S provided from the control section 40. The display section 20 performs a display operation by modulating the light projected from the backlight 30. The barrier driving section 41 drives the liquid crystal barrier section 10 based on the barrier control command signal CBR provided from the control section 40. The opening-closing sections 11 and 12 (12A and 12B) on the liquid crystal barrier section 10 perform open/closed operations based on the barrier control command signal CBR, transmitting or blocking the light that is projected from the backlight 30 and transmitted through the display section 20.

(Detailed Operation of Stereoscopic Display)

Next, the description is provided on the detailed operation in carrying out a stereoscopic display.

FIGS. 10A and 10B show an operation example of the display section 20 and the liquid crystal barrier section 10, wherein FIG. 10A denotes a case where the image signal SA is provided, while FIG. 10B denotes a case where the image signal SB is provided.

When the image signal SA is provided, as shown in FIG. 10A, each of the pixels Pix on the display section 20 displays pixel information P1 to P6 corresponding to each of six perspective images included in the image signal SA. At this time, the pixel information P1 to P6 are respectively displayed at the pixels Pix arranged in the vicinity of the opening-closing sections 12A. When the image signal SA is provided, on the liquid crystal barrier section 10, control is carried out so that the opening-closing sections 12A are put in an open state (transmitting state), while the opening-closing sections 12B are put in a closed state. The light emitting from each of the pixels Pix on the display section 20 is output with its angle limited by the opening-closing sections 12A. A viewer is allowed to see stereoscopic images by viewing the pixel information P3 with a left eye and the pixel information P4 with a right eye for example.

When the image signal SB is provided, as shown in FIG. 10B, each of the pixels Pix on the display section 20 displays pixel information P1 to P6 corresponding to each of six perspective images included in the image signal SB. At this time, the pixel information P1 to P6 are respectively displayed at the pixels Pix arranged in the vicinity of the opening-closing sections 12B. When the image signal SB is provided, on the liquid crystal barrier section 10, control is carried out so that the opening-closing sections 12B are put in an open state (transmitting state), while the opening-closing sections 12A are put in a closed state. The light emitting from each of the pixels Pix on the display section 20 is output with its angle limited by the opening-closing sections 12B. A viewer is allowed to see stereoscopic images by viewing the pixel information P3 with a left eye and the pixel information P4 with a right eye for example.

In such a manner, a viewer sees different pixel information among the pixel information P1 to P6 with a left eye and a right eye, thereby allowing to feel such pixel information as stereoscopic images. Further, images are displayed with the opening-closing sections 12A and the opening-closing sections 12B open alternately on the time-division basis, which enables a viewer to see averaged images displayed at positions shifted from each other. This allows the stereoscopic display unit 1 to achieve the resolution twice as high as a case where only the opening-closing sections 12A are provided. In other words, the resolution required for the stereoscopic display unit 1 is only one third (=⅙×2) of the case of two-dimensional display.

(Viewing Angle Characteristics and Moire)

Next, the description is provided on the viewing angle characteristics of the stereoscopic display unit 1, and moire arising when images are displayed.

FIGS. 11A and 11B show electrode patterns of the opening-closing sections 12 related to a stereoscopic display. FIG. 11A denotes a case where the image signal SA is provided, and FIG. 11B denotes a case where the image signal SB is provided. It is to be noted that FIGS. 11A and 11B illustrate only an electrode pattern of the opening-closing sections that are placed in an open state (transmitting state).

When the image signal SA is provided, as shown in FIG. 11A, the opening-closing sections 12A related to two transparent electrodes 121 and 122 among the opening-closing sections related to eight transparent electrodes as the unit U are placed in an open state. As shown in FIG. 11A, liquid crystal molecules M on the liquid crystal layer 19 are aligned in the extending direction of the branch portions 63 of these transparent electrodes 121 and 122. At this time, an alignment pattern of the liquid crystal molecules M on the adjoining opening-closing sections 12A is different from each other depending on a difference in an electrode pattern of the transparent electrodes 121 and 122.

Similarly, when the image signal SB is provided, as shown in FIG. 11B, the opening-closing sections 12B related to two transparent electrodes 121 and 122 among the opening-closing sections related to eight transparent electrodes as the unit U are placed in an open state. Also in this case, an alignment pattern of the liquid crystal molecules M on the adjoining opening-closing sections 12B is different from each other depending on a difference in an electrode pattern of the transparent electrodes 121 and 122.

Figure 12:
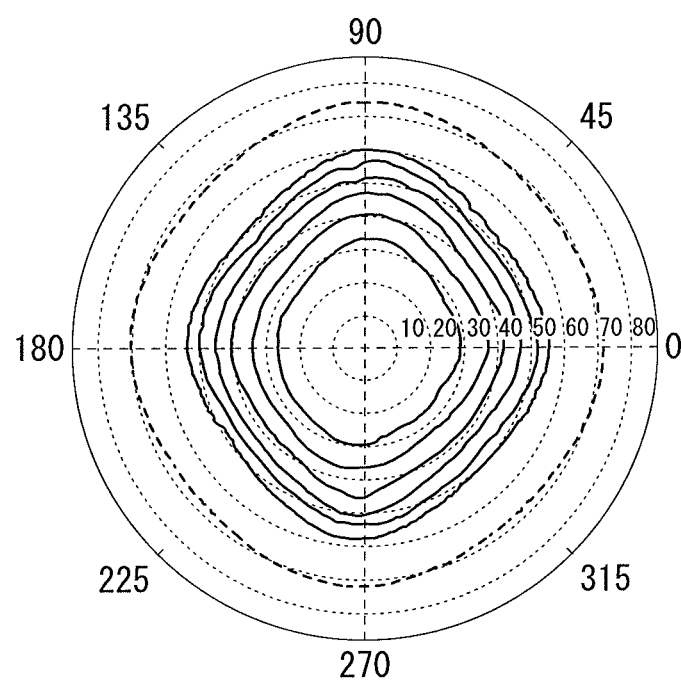
FIG. 12 is an explanatory diagram showing a viewing angle characteristics according to the first embodiment of the present disclosure.

FIG. 12 shows the viewing angle characteristics of the stereoscopic display unit 1 at the time of a stereoscopic display. In FIG. 12, a right-and-left direction corresponds to a horizontal direction of a display screen on the stereoscopic display unit 1, while an up-and-down direction corresponds to a vertical direction of the display screen. FIG. 12 illustrates the brightness during a white color display using contour lines, denoting that the brightness increases more as getting closer to a center. Further, dotted lines indicate the contour lines corresponding to a half of the peak brightness.

As shown in FIG. 12, the contour lines are symmetric relative to the right-and-left direction and the up-and-down direction. This means that, on the stereoscopic display unit 1, for example, the brightness when viewed from a predetermined angle in the right direction toward a display screen is almost identical to the brightness from the same predetermined angle in the left direction, and similarly the brightness when viewed from a predetermined angle in the upper direction is almost identical to the brightness from the same predetermined angle in the lower direction. In other words, the viewing angle characteristics of the stereoscopic display unit 1 are symmetric relative to the right-and-left direction and the up-and-down direction.

As described above, on the stereoscopic display unit 1, the transparent electrodes 120 (transparent electrodes 121 and 122) that have electrode patterns different from each other in a case where a display is performed based on the image signal SA and a display is performed based on the image signal SB are placed in open state at the same time, which allows the viewing angle characteristics to be made symmetric relative to the right-and-left direction and the up-and-down direction.

The description is hitherto provided on the viewing angle characteristics in the case of a stereoscopic display, although a case of a normal display (two-dimensional display) holds true as well. In the case of a normal display, the opening-closing sections 11 are also put in an open state (transmitting state) in addition to the opening-closing sections 12. As shown in FIG. 8, two transparent electrodes 111 and two transparent electrodes 112 among eight transparent electrodes as the unit U are related to the opening-closing sections 11. In the case of a normal display, therefore, in addition to the transparent electrodes 120 (transparent electrodes 121 and 122), the transparent electrodes 110 (transparent electrodes 111 and 112) having electrode patterns different from each other are placed in open state at the same time, which allows the viewing angle characteristics to be made symmetric relative to the right-and-left direction and the up-and-down direction as with the case of a stereoscopic display.

Further, in the stereoscopic display unit 1, each of the transparent electrodes 110 (transparent electrodes 111 and 112) as well as the transparent electrodes 120 (transparent electrodes 121 and 122) has two branch regions 71 and 72. In other words, each of the transparent electrodes 110 and 120 employs a so-called two-domain configuration. As will be described in comparison with comparative examples hereinafter, such a configuration makes it possible to reduce moire.

Next, the action according to the embodiment of the present disclosure is described as compared with several comparative examples.

Comparative Example 1

First, the description is provided on a stereoscopic display unit 1R according to a comparative example 1. In this stereoscopic display unit 1R, each of transparent electrodes on a liquid crystal barrier section 10R employs a so-called four-domain configuration.

Figure 13:
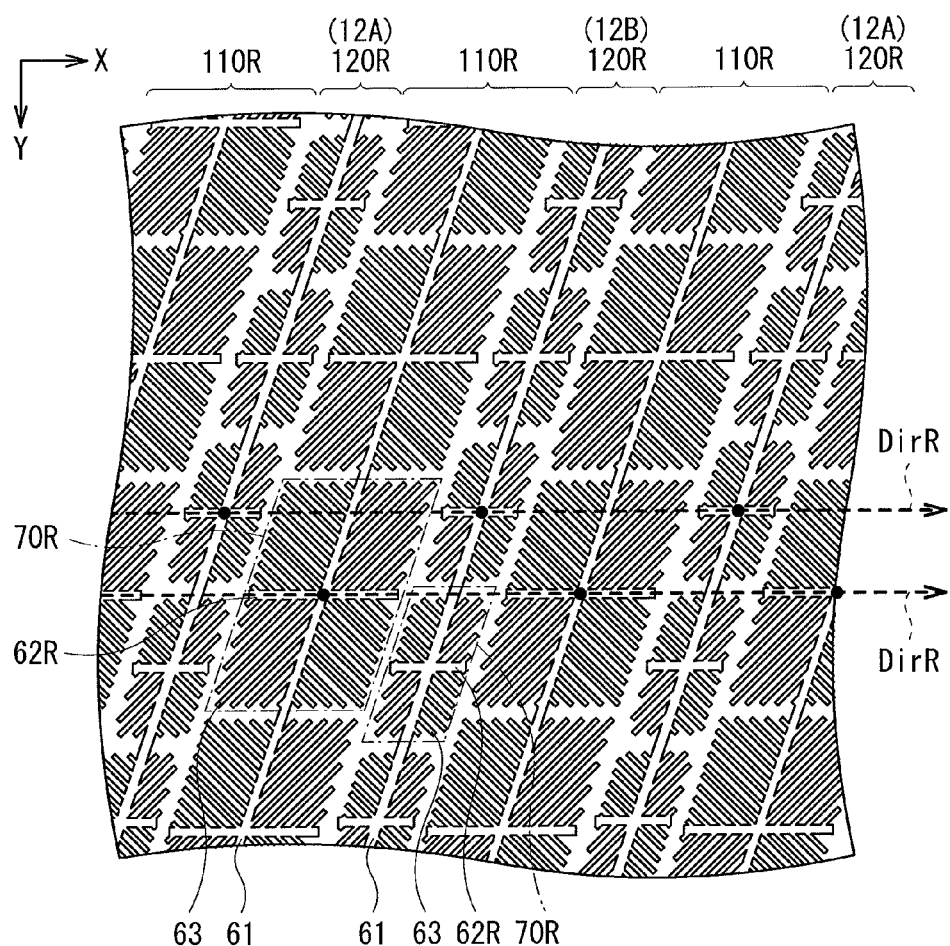
FIG. 13 is a plan view showing a configuration example of a transparent electrode according to a comparative example 1.
Figure 14:
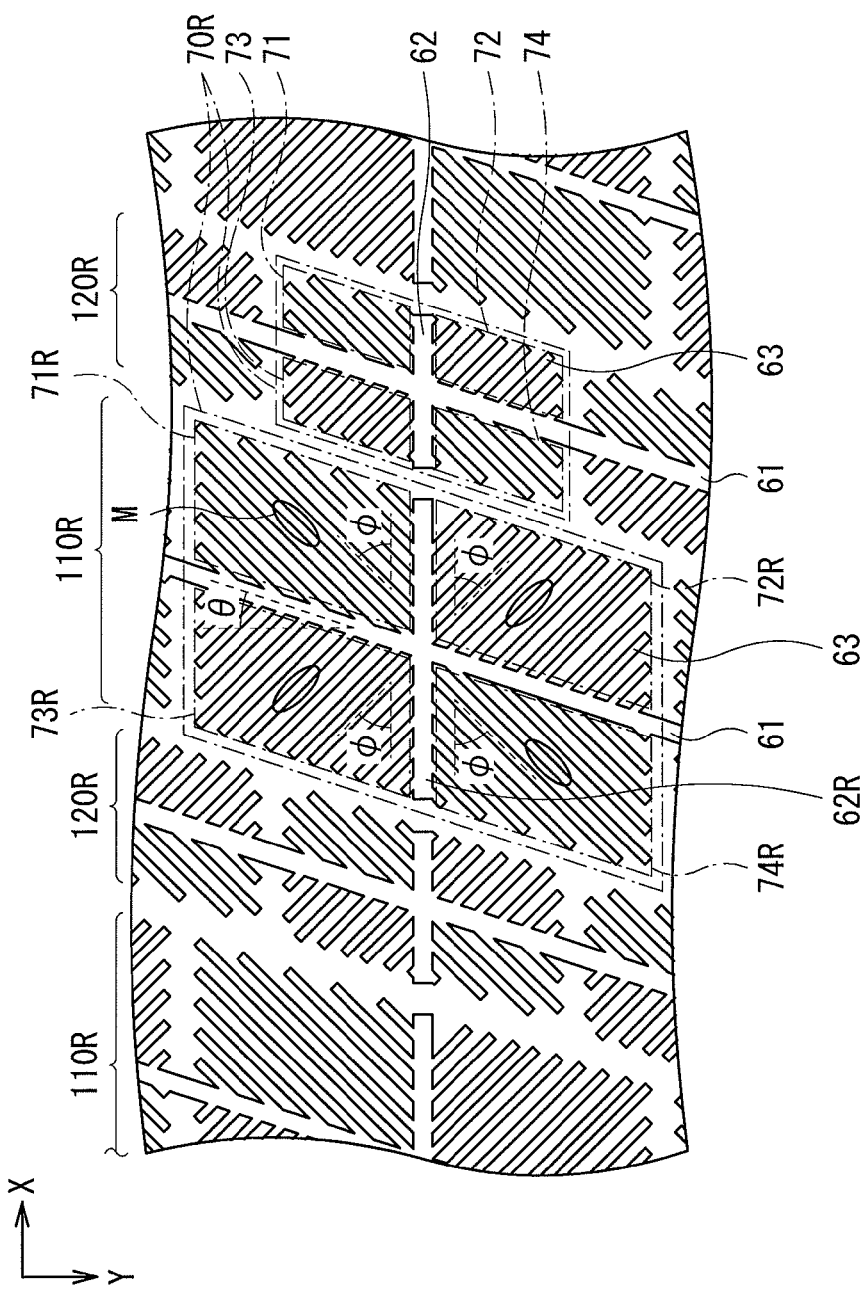
FIG. 14 is another plan view showing a configuration example of a transparent electrode according to a comparative example 1.

Each of FIG. 13 and FIG. 14 shows a configuration example of a transparent electrode layer 15 in the liquid crystal barrier section 10R according to the comparative example 1.

As shown in FIG. 13, in the transparent electrode layer 15 of the liquid crystal barrier section 10R, transparent electrodes 110R corresponding to the opening-closing sections 11 and transparent electrodes 120R corresponding to the opening-closing sections 12 are placed side by side, and in on each of the transparent electrodes 110R and 120R, a sub-electrode region 70R is placed in parallel along the extending direction of stem portions 61. Each of the sub-electrode regions 70R has a stem portion 62R. The stem portions 62R intersect with the stem portions 61, while being formed to extend in the horizontal direction X. The sub-electrode regions 70R at the adjoining transparent electrodes 110R are arranged in the same horizontal direction X as the extending direction of the stem portions 62R (array direction DirR), and the sub-electrode regions 70R at the adjoining transparent electrodes 120R are also arranged in the horizontal direction X (array direction DirR).

As shown in FIG. 14, in each of the sub-electrode regions 70R, four branch regions (domains) 71R to 74R (to be described later) are provided that are partitioned by the stem portions 61 and the stem portions 62R. Branch portions 63 are formed to extend from the stem portions 61 and 62R at each of the branch regions 71R to 74R. The extending direction of the branch portions 63 at the branch region 71R and the extending direction of the branch portions 63 at the branch region 73R are axisymmetric with respect to the vertical direction Y as an axis, and similarly the extending direction of the branch portions 63 at the branch region 72R and the extending direction of the branch portions 63 at the branch region 74R are axisymmetric with respect to the vertical direction Y as an axis. Further, the extending direction of the branch portions 63 at the branch region 71R and the extending direction of the branch portions 63 at the branch region 72R are axisymmetric with respect to the horizontal direction X as an axis, and similarly the extending direction of the branch portions 63 at the branch region 73R and the extending direction of the branch portions 63 at the branch region 74R are axisymmetric with respect to the horizontal direction X as an axis. In this example, in concrete terms, the branch portions 63 at the branch regions 71R and 74R extend in the direction rotated by a predetermined angle φ counterclockwise from the horizontal direction X, while the branch portions 63 at the branch regions 72R and 73R extend in the direction rotated by a predetermined angle φ clockwise from the horizontal direction X. The angle φ is 45 degrees for example. As shown in FIG. 14, the liquid crystal molecules M in the liquid crystal layer 19 are aligned in the extending direction of the branch portions 63 at these branch regions 71R to 74R. With such a configuration, in the stereoscopic display unit 1R, the viewing angle characteristics become symmetric relative to the right-and-left direction and the up-and-down direction.

Figure 15:
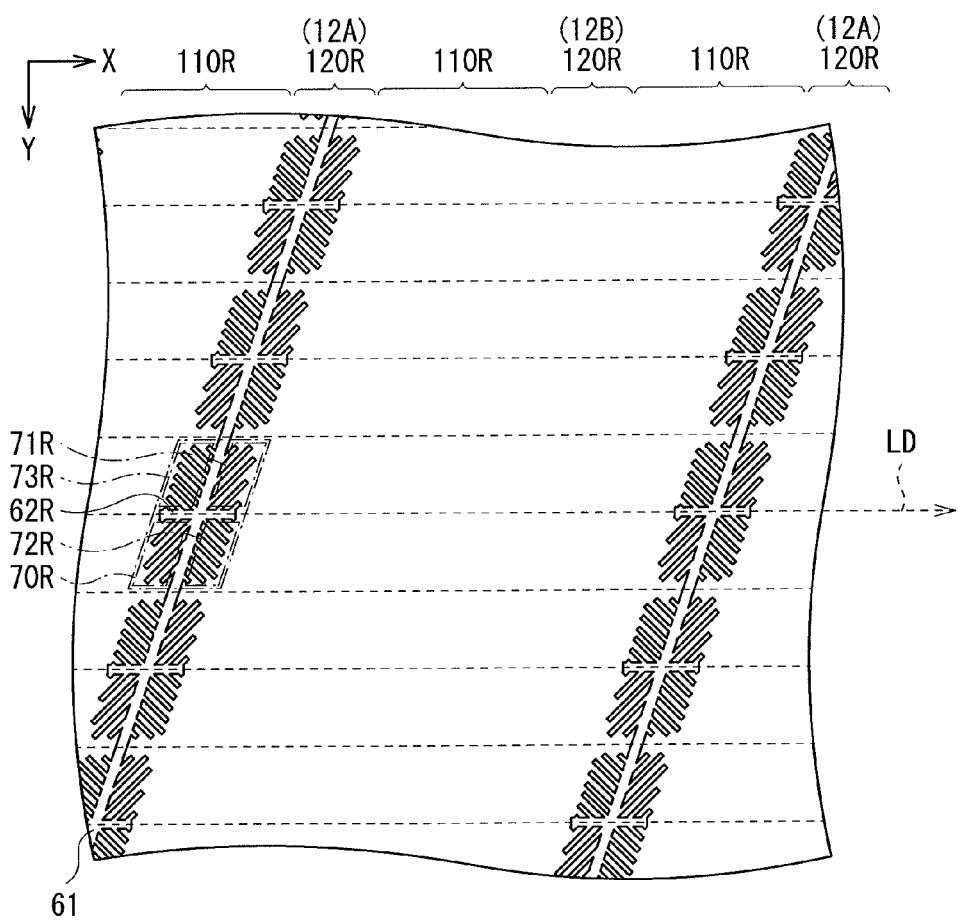
FIG. 15 is another plan view showing a configuration example of a transparent electrode according to a comparative example 1.

FIG. 15 shows an electrode pattern of the opening-closing sections 12 related to a stereoscopic display, denoting a case where the image signal SA is provided. Like FIG. 11A, FIG. 15 illustrates only an electrode pattern of the opening-closing sections 12A that are placed in an open state (transmitting state) when the image signal SA is provided.

As shown in FIG. 13, in the comparative example 1, since the sub-electrode regions 70R on the adjoining transparent electrodes 120R are placed side by side in the horizontal direction X (array direction DirR), border portions of the branch regions (domains) 71R to 74R in the transparent electrodes 120R are arrayed on a single straight line (on a domain borderline LD) extending in the array direction DirR. In concrete terms, a border portion between the branch regions 71R and 73R and the branch regions 72R and 74R is arrayed on the domain borderline LD. In other words, a border portion between the stem portion 62R and the sub-electrode regions 70R adjoining in the extending direction of the opening-closing sections 12 is arrayed on the domain borderline LD. At the border portions of these branch regions (domains) 71R to 74R, even if a voltage is applied between the transparent electrode layer 17 and the transparent electrode 120R, light may not be transmitted sufficiently because of insufficient alignment of the liquid crystal molecules in the liquid crystal layer 19. That is, such a domain borderline LD becomes so-called a dark line.

Figures 16A, 16B:
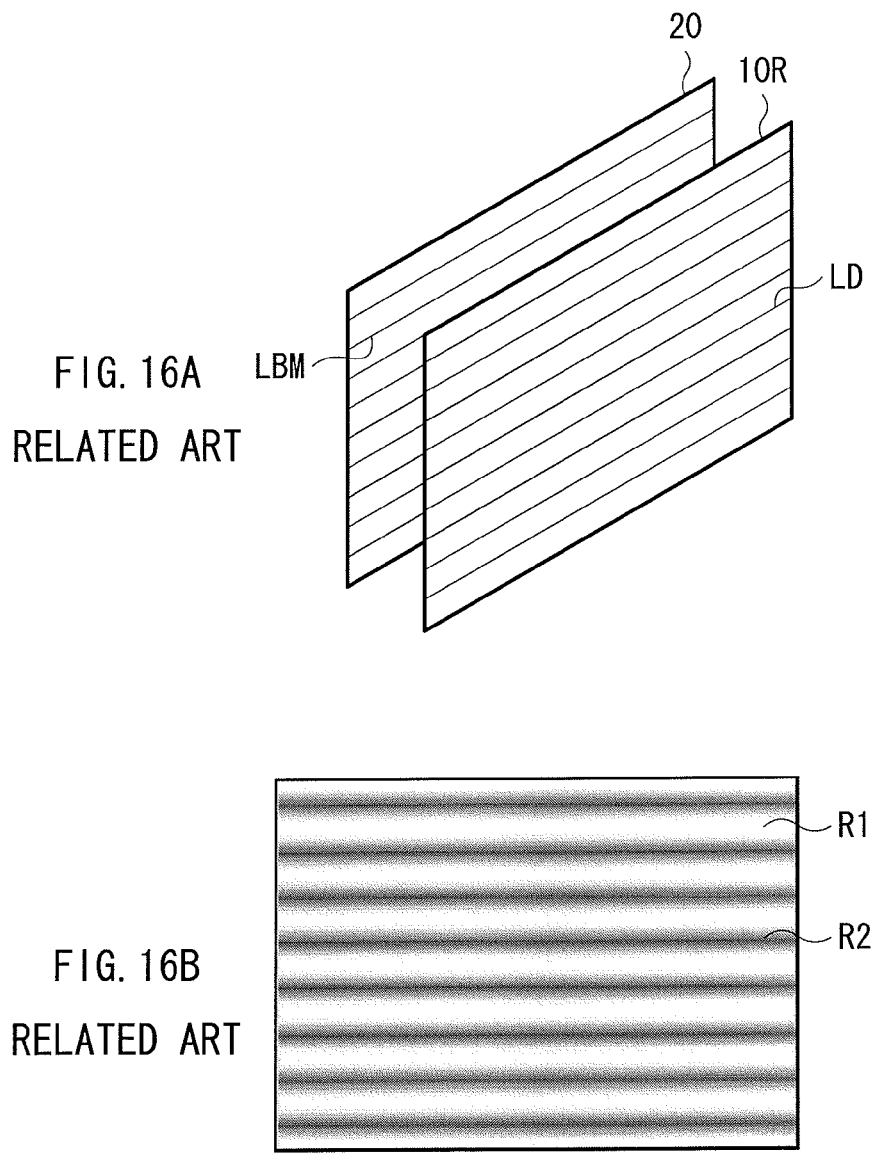
FIGS. 16A and 16B are each explanatory diagram illustrating moire on a stereoscopic display unit according to a comparative example 1.

FIG. 16A shows a correlation between a black matrix on the display section 20 and the domain borderline LD of the liquid crystal barrier section 10R, while FIG. 16B illustrates moire arising on a display screen. For convenience of explanation, FIG. 16A only shows a black matrix extending in the horizontal direction (light-shielding line LBM) among black matrixes on the display section 20.

As shown in FIG. 16A, both of the light-shielding lines LBM of the display section 20 and the domain borderlines LD of the liquid crystal barrier section 10R extend in the horizontal direction X within a display surface on the stereoscopic display unit 1R. Further, as shown in FIGS. 2A and 2B, the display section 20 and the liquid crystal barrier section 10R are disposed side by side in the depth direction when a viewer watches the stereoscopic display unit 1R. Consequently, depending on a positional relationship between the stereoscopic display unit 1R and a viewer, displacement may occur between an array cycle of the light-shielding lines LBM and an array cycle of the domain borderlines LD in the vertical direction Y, resulting in the moire as shown in FIG. 16B being possibly perceived by a viewer. In particular, for example, a display screen region where the domain borderlines LD and the light-shielding lines LBM are almost overlapped with each other becomes a bright section R1, while a display screen region where the domain borderlines LD and the light-shielding lines LBM are significantly displaced becomes a dark section R2. In such a manner, a viewer perceives a luminance difference between the bright section R1 and the dark section R2 as the moire.

As described above, on the stereoscopic display unit 1R according to this comparative example, since the sub-electrode regions 70R in the adjoining transparent electrodes 120R (110R) are arrayed in the horizontal direction X (array direction DirR) as shown in FIG. 13, the domain borderlines LD also extend in the horizontal direction X. Therefore, due to interference between the domain borderlines LD and the light-shielding lines LBM on the display section 20 extending in the horizontal direction X, the moire may arise.

Meanwhile, on the stereoscopic display unit 1 according to the embodiment of the present disclosure, as shown in FIG. 8, since each of the transparent electrodes 110 and 120 employs a two-domain configuration, and no domain borderlines occur in the horizontal direction X, it is possible to reduce the possibilities that moire would be generated.

Comparative Example 2

Next, the description is provided on stereoscopic display units 1S and 1T according to a comparative example 2. In liquid crystal barrier sections 10S and 10T of the stereoscopic display units 1S and 1T, either of the transparent electrodes 111 or 112 are only used to configure opening-closing sections 11, and either of the transparent electrodes 121 or 122 are only used to configure opening-closing sections 12.

Figure 17:
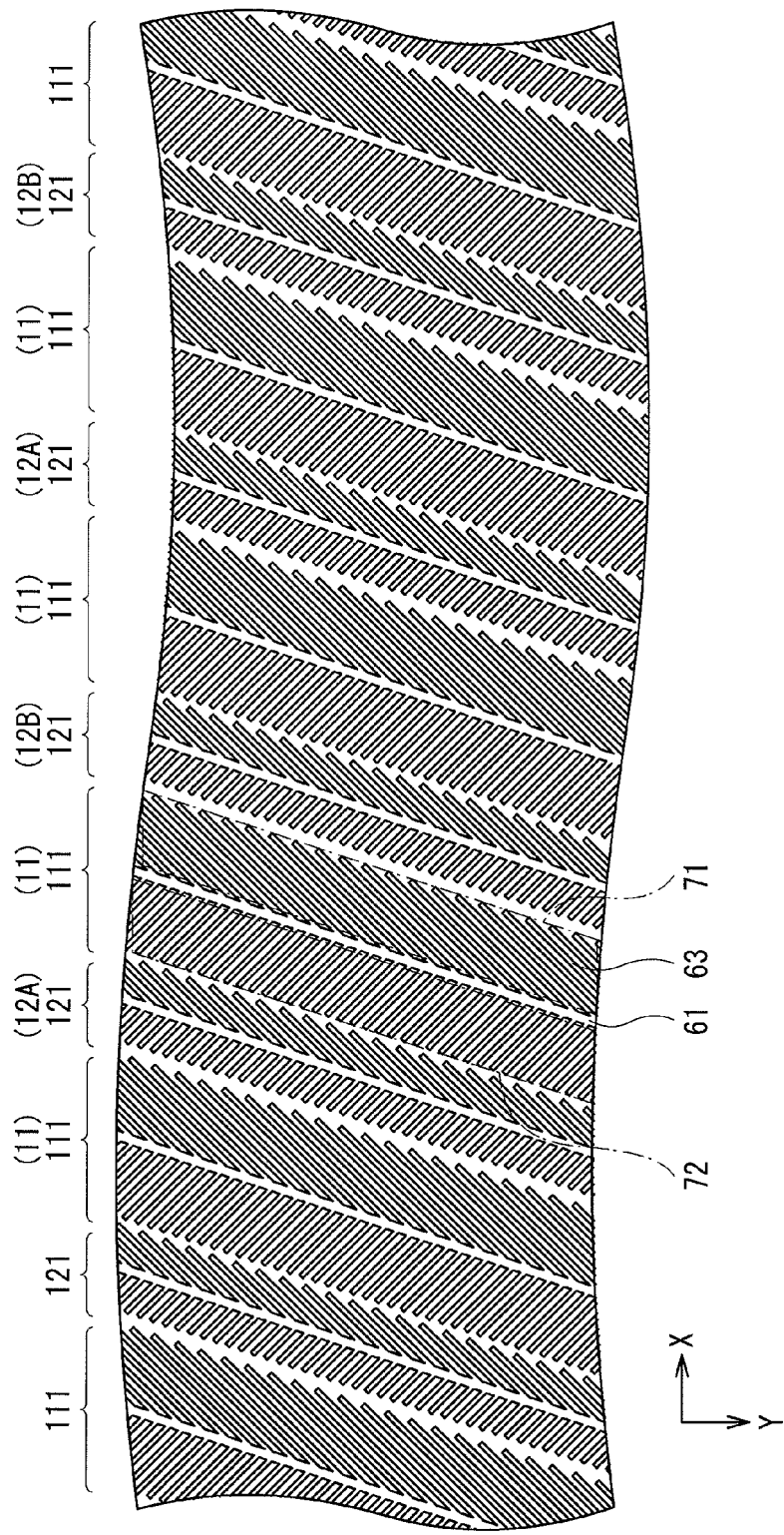
FIG. 17 is a plan view showing a configuration example of a transparent electrode according to a comparative example 2.

FIG. 17 shows a configuration example of a transparent electrode layer 15 of the liquid crystal barrier section 10S according to the comparative example 2. In the transparent electrode layer 15 of the liquid crystal barrier section 10S, the transparent electrodes 111 corresponding to the opening-closing sections 11 and the transparent electrodes 121 corresponding to the opening-closing sections 12 are placed side by side alternately along the horizontal direction X. The transparent electrodes 121 that are placed side by side compose opening-closing sections 12A and opening-closing sections 12B alternately.

FIGS. 18A and 18B show an electrode pattern of the opening-closing sections 12 related to a stereoscopic display in the stereoscopic display unit 1S. FIG. 18A denotes a case where the image signal SA is provided, while FIG. 18B denotes a case where the image signal SB is provided.

When the image signal SA is provided, as shown in FIG. 18A, the opening-closing sections 12A are placed in an open state. When the image signal SB is provided, as shown in FIG. 18B, the opening-closing sections 12B are placed in an open state. At this time, in the liquid crystal barrier section 10S, the opening-closing sections 12 are composed of only the transparent electrodes 121, and thus an alignment pattern of the liquid crystal molecules M in the opening-closing sections 12 is identical to each other.

Figure 19A:
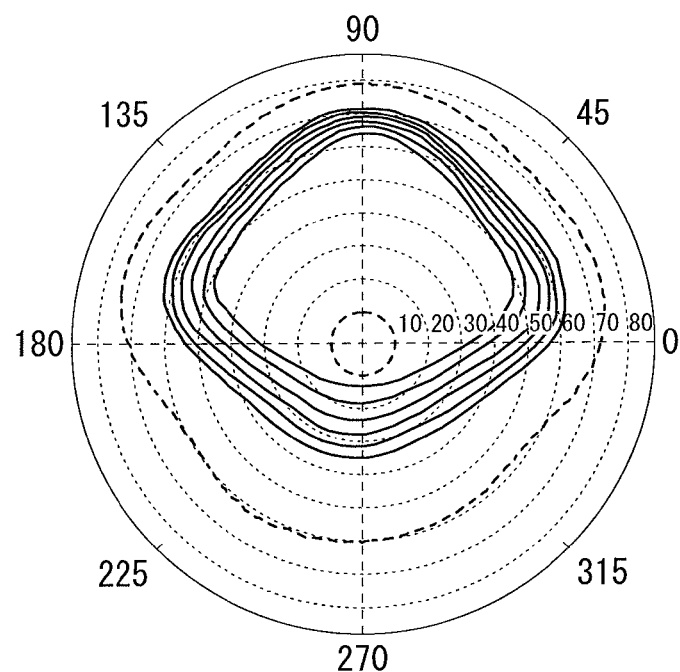
FIGS. 19A and 19B are each explanatory diagram showing the viewing angle characteristics according to a comparative example 2.

FIG. 19A shows the viewing angle characteristics of the stereoscopic display unit 1S at the time of a stereoscopic display. As shown in FIG. 19A, contour lines are symmetric relative to the right-and-left direction, although they are asymmetric relative to the up-and-down direction. In concrete terms, in the stereoscopic display unit 1S, as shown in FIG. 19A, for example, the brightness when viewed from a predetermined angle in the upper direction toward a display screen is greater than the brightness from the same predetermined angle in the lower direction. That is, the viewing angle characteristics of the stereoscopic display unit 1S are asymmetric relative to the up-and-down direction.

Subsequently, the description is provided on a stereoscopic display unit 1T having a liquid crystal barrier section 10T that is different from the liquid crystal barrier section 10S as this comparative example 2.

Figure 20:
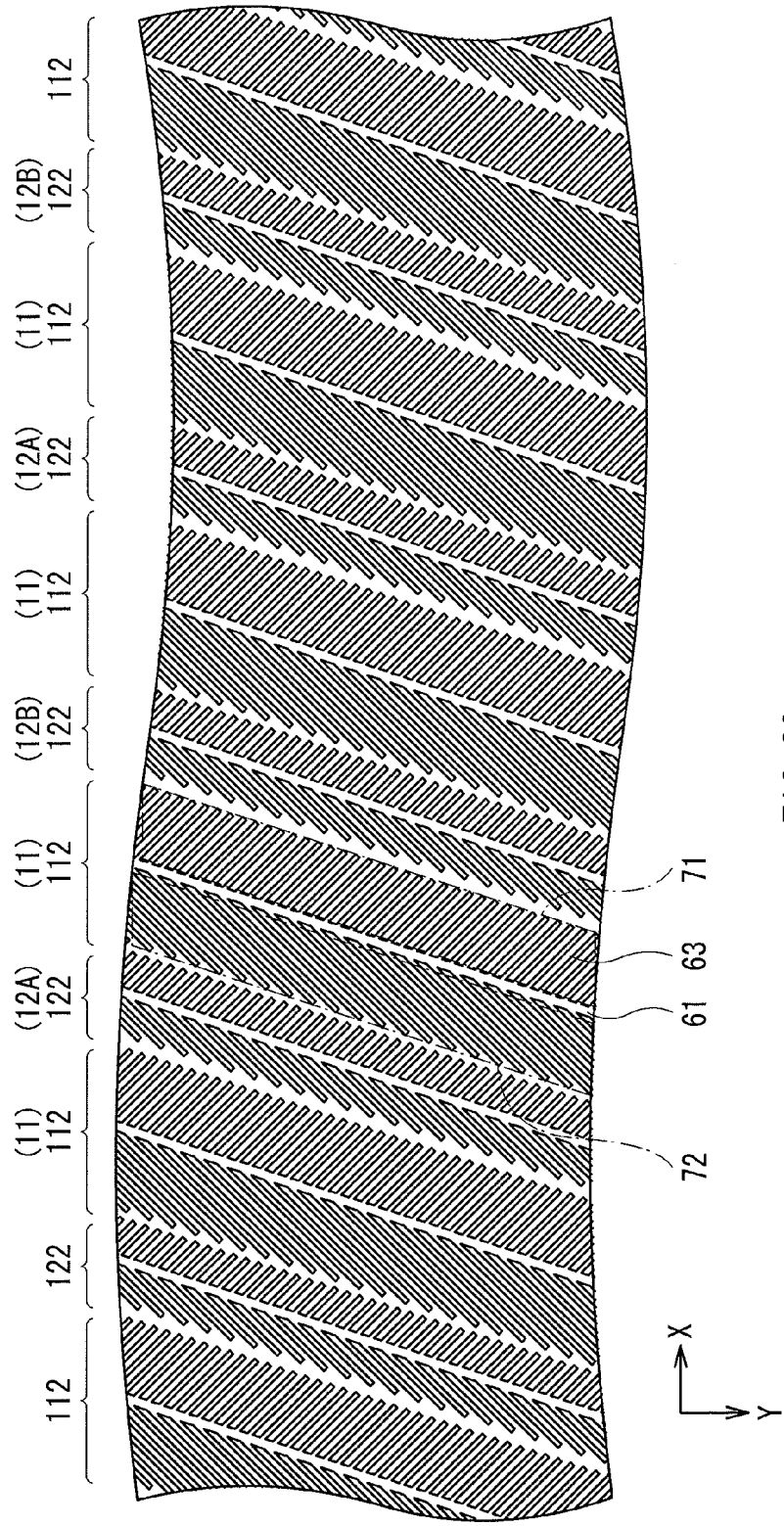
FIG. 20 is a plan view showing another configuration example of a transparent electrode according to a comparative example 2.

FIG. 20 shows a configuration example of a transparent electrode layer 15 of the liquid crystal barrier section 10T according to the comparative example 2. In the transparent electrode layer 15 of the liquid crystal barrier section 10T, the transparent electrodes 112 corresponding to the opening-closing sections 11 and the transparent electrodes 122 corresponding to the opening-closing sections 12 are placed side by side alternately along the horizontal direction X. That is, the liquid crystal barrier section 10T uses the transparent electrodes 112 instead of the transparent electrodes 111 in the liquid crystal barrier section 10S, and uses the transparent electrodes 122 instead of the transparent electrodes 121.

Figure 19B:
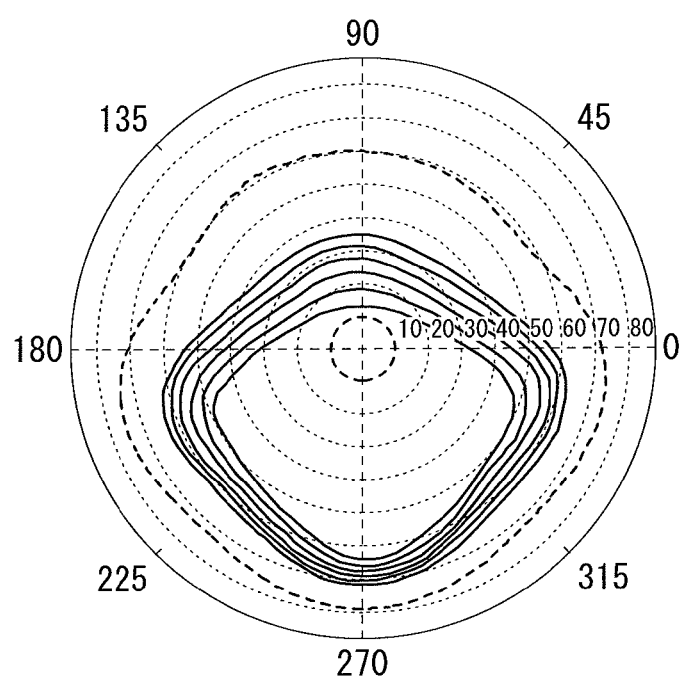

FIG. 19B shows the viewing angle characteristics of the stereoscopic display unit 1T at the time of a stereoscopic display. As shown in FIG. 19B, the viewing angle characteristics of the stereoscopic display unit 1T are asymmetric relative to the up-and-down direction as with a case of the stereoscopic display unit 1S (FIG. 19A). In concrete terms, in the stereoscopic display unit 1T, as shown in FIG. 19B, for example, the brightness when viewed from a predetermined angle in the lower direction toward a display screen is greater than the brightness from the same predetermined angle in the upper direction. In such a manner, depending on a difference in an electrode pattern between the transparent electrodes 121 in the stereoscopic display unit 1S and the transparent electrodes 122 in the stereoscopic display unit 1T, the viewing angle characteristics are different from each other as shown in FIGS. 19A and 19B.

It is to be noted that the description is hitherto provided on the viewing angle characteristics in the case of a stereoscopic display, although a case of a normal display (two-dimensional display) holds true as well. As described above, in the case of a normal display, the opening-closing sections 11 are also put in an open state (transmitting state) in addition to the opening-closing sections 12. However, on the stereoscopic display unit 1S (FIG. 17), the opening-closing sections 11 are composed of only the transparent electrodes 111, while in the stereoscopic display unit 1T (FIG. 20), the opening-closing sections 11 are composed of only the transparent electrodes 112. Consequently, depending on a difference in an electrode pattern between the transparent electrodes 111 in the stereoscopic display unit 1S and the transparent electrodes 112 in the stereoscopic display unit 1T, the viewing angle characteristics are different from each other as shown in FIGS. 19A and 19B.

Meanwhile, in the stereoscopic display unit 1 according to the embodiment of the present disclosure, in performing a stereoscopic display, the transparent electrodes 120 (transparent electrodes 121 and 122) having electrode patterns different from each other in a case where a display is performed based on the image signal SA and a display is performed based on the image signal SB are placed in open state at the same time. Further, in performing a normal display, the transparent electrodes 110 (transparent electrodes 111 and 112) having electrode patterns different from each other are also placed in open state at the same time in addition to the transparent electrodes 120 (transparent electrodes 121 and 122). As a result, the viewing angle characteristics corresponding to the transparent electrodes 111 and 121 (FIG. 19A) and the viewing angle characteristics corresponding to the transparent electrodes 112 and 122 (FIG. 19B) are mixed, which allows to obtain the viewing angle characteristics symmetric relative to the right-and-left direction and the up-and-down direction.

(Advantageous Effects)

As described above, according to the embodiment of the present disclosure, each of the transparent electrodes employs two-domain configuration, thereby making it possible to reduce moire.

Further, according to the embodiment of the present disclosure, the transparent electrodes 110 (transparent electrodes 111 and 112) as well as the transparent electrodes 120 (transparent electrodes 121 and 122) each of which has electrode patterns different from each other are used, which makes it possible to enhance a degree of freedom of the viewing angle characteristics to be set.

Moreover, according to the embodiment of the present disclosure, in performing a stereoscopic display, the transparent electrodes 120 (transparent electrodes 121 and 122) having electrode patterns different from each other are placed in open state at the same time, which allows to obtain the viewing angle characteristics symmetric relative to the right-and-left direction and the up-and-down direction.

Further, according to the embodiment of the present disclosure, in performing a normal display (two-dimensional display), the transparent electrodes 110 (transparent electrodes 111 and 112) having electrode patterns different from each other are also placed in open state at the same time in addition to the transparent electrodes 120 (transparent electrodes 121 and 122), which allows to obtain the viewing angle characteristics symmetric relative to the right-and-left direction and the up-and-down direction.

Modification Example 1-1

According to the embodiment of the present disclosure, the transparent electrodes 120 (transparent electrodes 121 and 122) having electrode patterns different from each other are placed in open state at the same time, although the arrangement is not limited thereto. Alternatively, for example, the transparent electrodes 120 (transparent electrodes 121 and 122) having electrode patterns different from each other may be placed in open state on a time-division basis. Hereinafter, the details will be described using a stereoscopic display unit 1A having such a liquid crystal barrier section 10A.

Figure 21:
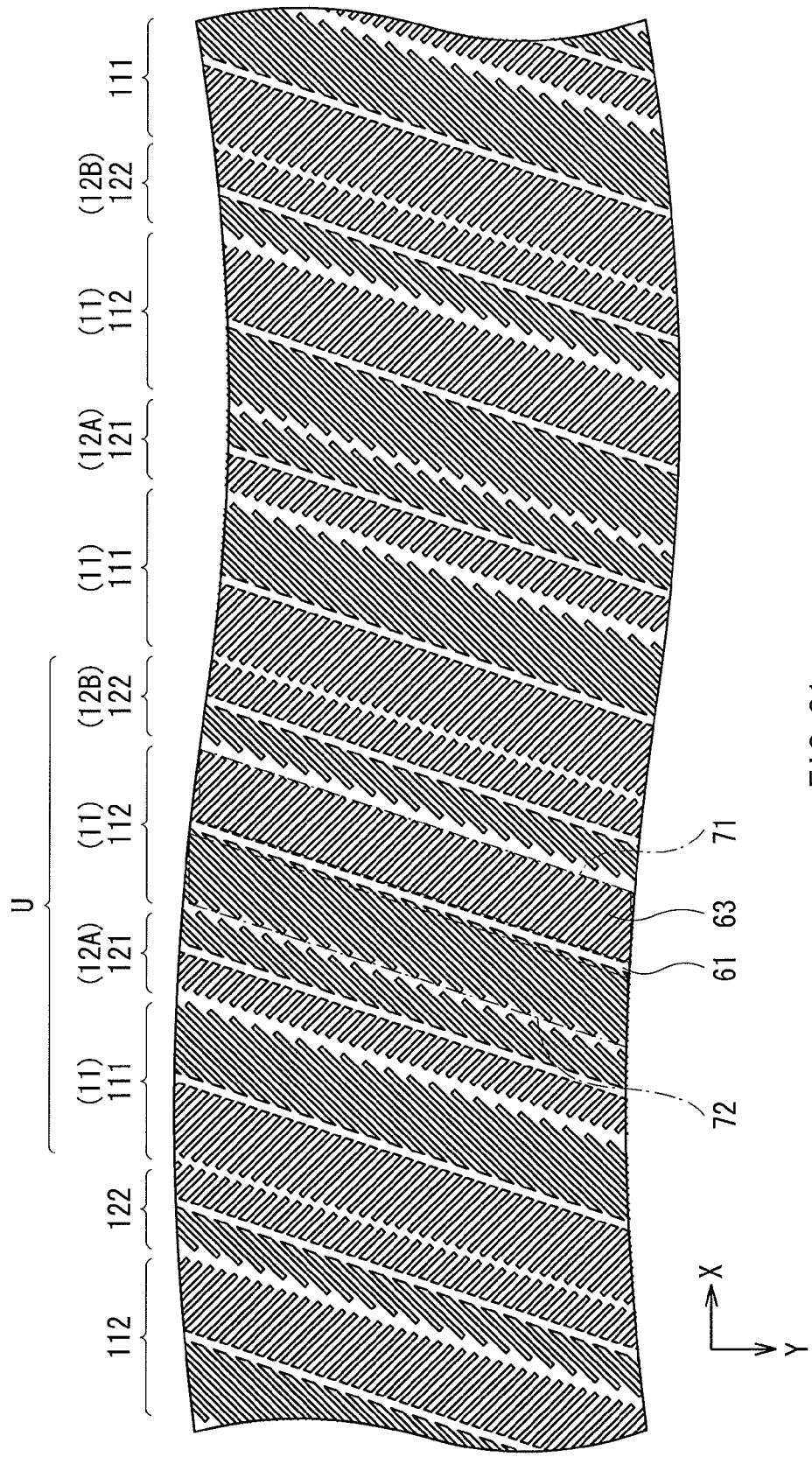
FIG. 21 is a plan view showing a configuration example of a transparent electrode according to a modification example of the first embodiment of the present disclosure.

FIG. 21 shows a configuration example of a transparent electrode layer 15 in the liquid crystal barrier section 10A. In the transparent electrode layer 15, the transparent electrodes 111, 121, 112, and 122 are disposed along the horizontal direction X in this order, while being disposed repeatedly with these four transparent electrodes as a unit U. In this example, the transparent electrodes 121 compose the opening-closing sections 12A, and the transparent electrodes 122 compose the opening-closing sections 12B, while the transparent electrodes 111 and 112 compose the opening-closing sections 11.

Figure 22A:
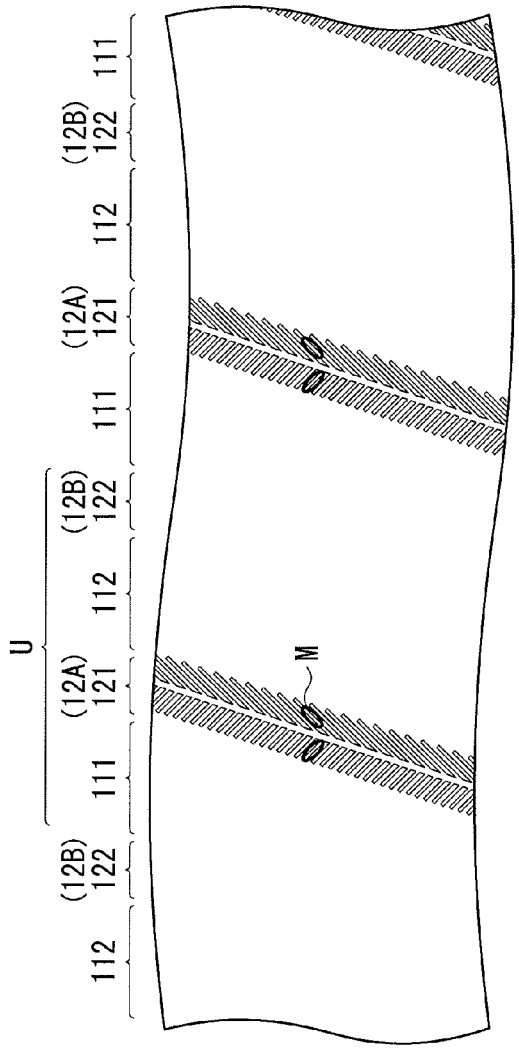
FIGS. 22A and 22B are each another plan view showing a configuration example of a transparent electrode according to a modification example of the first embodiment of the present disclosure.
Figure 22B:
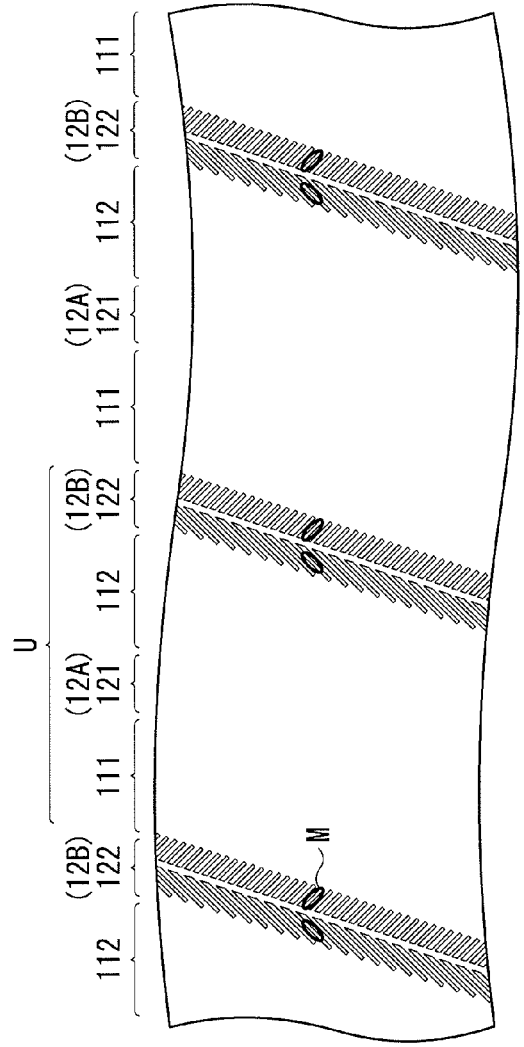

FIGS. 22A and 22B show an electrode pattern of the opening-closing sections 12 related to a stereoscopic display in the stereoscopic display unit 1A. FIG. 22A denotes a case where the image signal SA is provided, while FIG. 22B denotes a case where the image signal SB is provided.

When the image signal SA is provided, as shown in FIG. 22A, the opening-closing sections 12A are placed in an open state. At this time, in the liquid crystal barrier section 10A, the opening-closing sections 12A are composed of only the transparent electrodes 121. Further, when the image signal SB is provided, as shown in FIG. 22B, the opening-closing sections 12B are placed in an open state. At this time, in the liquid crystal barrier section 10A, the opening-closing sections 12B are composed of only the transparent electrodes 122. Depending on a difference in the electrode pattern on the transparent electrodes 121 and 122 in a case where the image signal SA is provided and a case where the image signal SB is provided, an alignment pattern of the liquid crystal molecules M in the opening-closing sections 12A is different from each other.

As described above, in the stereoscopic display unit 1A according to this modification example, the transparent electrodes 121 and 122 having electrode patterns different from each other are placed in open state on a time-division basis, which allows to obtain the viewing angle characteristics symmetric relative to the right-and-left direction and the up-and-down direction.

2. Second Embodiment

Next, the description is provided on a stereoscopic display unit 2 according to a second embodiment of the present disclosure. In the second embodiment of the present disclosure, the opening-closing sections 12 form no groups, and all the opening-closing sections 12 are put in open state in performing a stereoscopic display operation. It is to be noted that any component parts substantially same as the stereoscopic display unit 1 according to the first embodiment of the present disclosure are denoted with the same reference numerals, and the related descriptions are omitted as appropriate.

Figure 23:
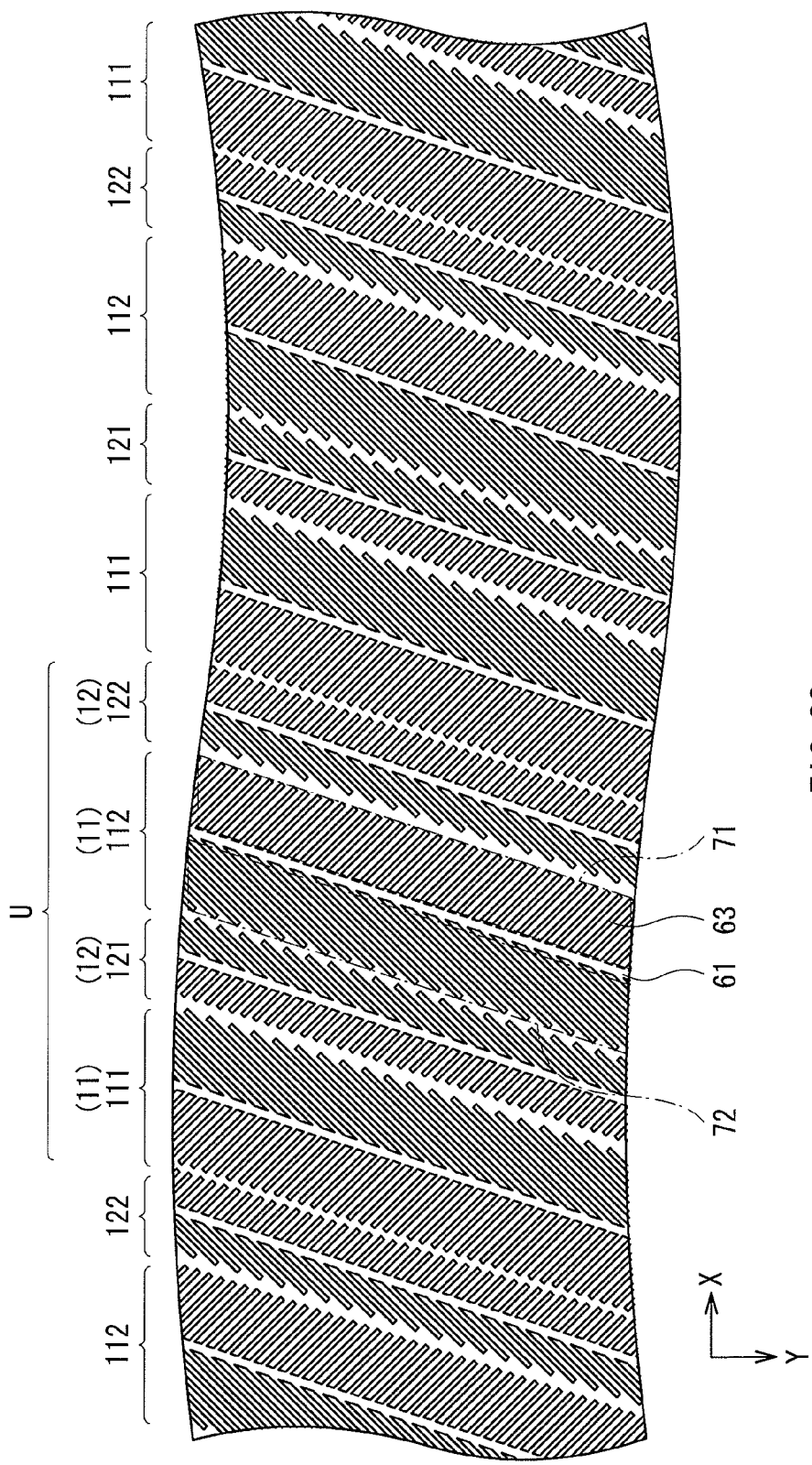
FIG. 23 is a plan view showing a configuration example of a transparent electrode according to a second embodiment of the present disclosure.

FIG. 23 shows a configuration example of a transparent electrode layer 15 of a liquid crystal barrier section 90 according to the second embodiment of the present disclosure. In the transparent electrode layer 15, the transparent electrodes 111, 121, 112, and 122 are disposed along the horizontal direction X in this order, while being disposed repeatedly with these four transparent electrodes as a unit U. In this example, the transparent electrodes 121 and 122 compose the opening-closing sections 12, and the transparent electrodes 111 and 112 compose the opening-closing sections 11.

Figure 24:
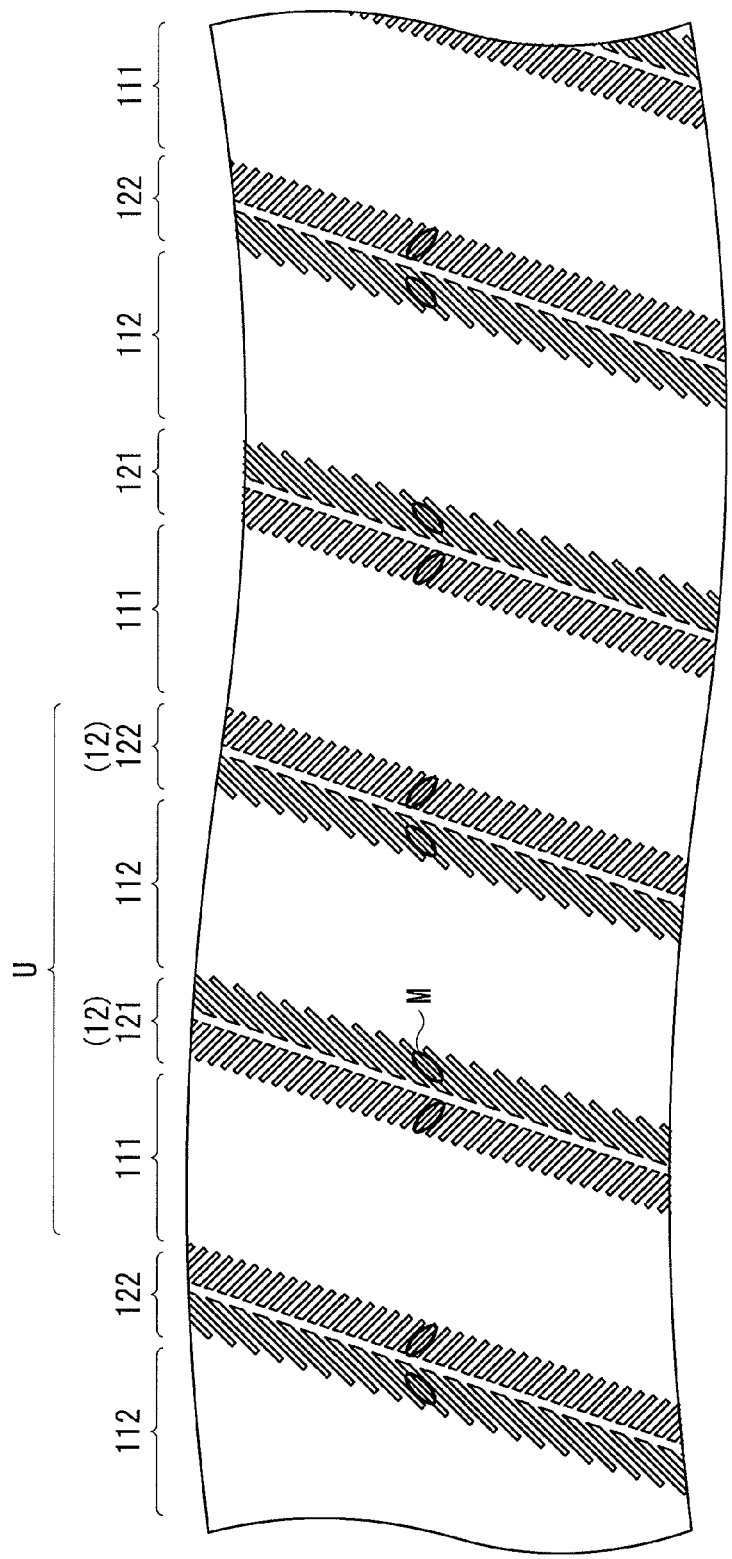
FIG. 24 is another plan view showing a configuration example of a transparent electrode according to the second embodiment of the present disclosure.

FIG. 24 shows an electrode pattern of the opening-closing sections 12 related to a stereoscopic display on the stereoscopic display unit 2. In the stereoscopic display unit 2, all the opening-closing sections 12 are put in open state in performing a stereoscopic display operation. As shown in FIG. 24, the liquid crystal molecules M in the liquid crystal layer 19 are aligned in the extending direction of branch portions 63 of these transparent electrodes 121 and 122. At this time, the alignment pattern of the liquid crystal molecules M at the adjoining opening-closing sections 12 is different from each other depending on a difference in the electrode pattern between the transparent electrodes 121 and 122.

In such a manner, in the stereoscopic display unit 2 according to the second embodiment of the present disclosure, in carrying out a stereoscopic display operation without opening and closing the opening-closing sections 12 on a time-division basis, the transparent electrodes 121 and 122 having electrode patterns different from each other are used, which allows to obtain the viewing angle characteristics symmetric relative to the right-and-left direction and the up-and-down direction.

Modification Example 2-1

In the above-described embodiment of the present disclosure, the transparent electrodes 110 (transparent electrodes 111 and 112) as well as the transparent electrodes 120 (transparent electrodes 121 and 122) employ a so-called two-domain configuration, although the arrangement is not limited thereto. Alternatively, for example, a single-domain configuration may be used. Hereinafter, the details will be described using a stereoscopic display unit 2A having such a liquid crystal barrier section 90A.

Figure 25:
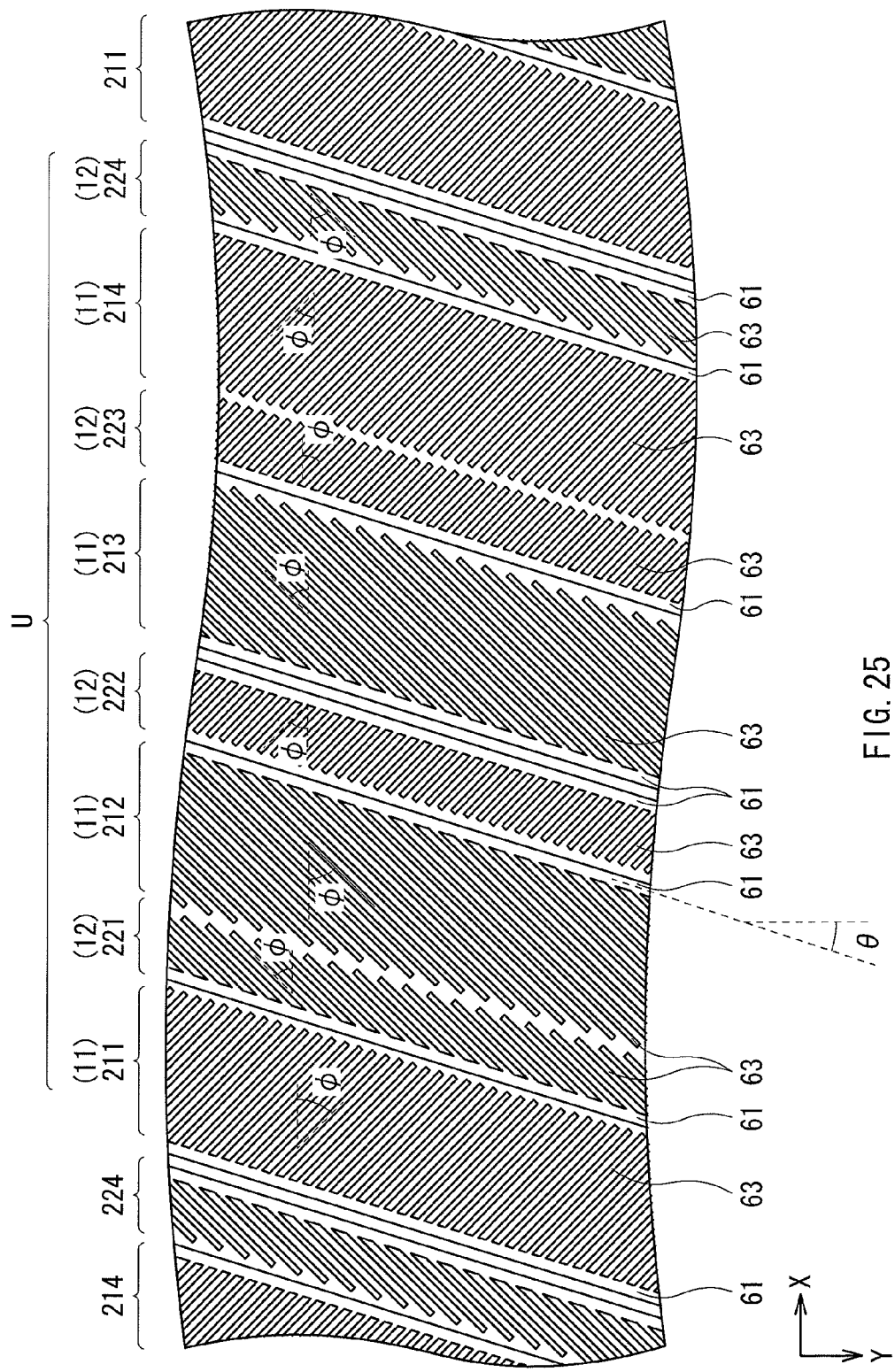
FIG. 25 is a plan view showing a configuration example of a transparent electrode according to a modification example of the second embodiment of the present disclosure.

FIG. 25 shows a configuration example of a transparent electrode layer 15 in the liquid crystal barrier section 90A of the modification example 2-1. The transparent electrode layer 15 has transparent electrodes 211 to 214 related to opening-closing sections 11, and transparent electrodes 221 to 224 related to opening-closing sections 12.

The transparent electrodes 211 to 214 and 221 to 224 are so-called single-domain electrodes, in which branch regions are provided at only one side of stem portions 61, and branch portions 63 are formed to extend from the stem portions 61 at the branch regions.

In concrete terms, in the transparent electrodes 211, the branch portions 63 are formed only at the right side of the stem portions 61, and extend in the direction rotated by a predetermined angle $\phi$ clockwise from the horizontal direction X in FIG. 25. In the transparent electrodes 212, the branch portions 63 are formed only at the left side of the stem portions 61, and extend in the direction rotated by a predetermined angle $\phi$ counterclockwise from the horizontal direction X. On the transparent electrodes 213, the branch portions 63 are formed only at the right side of the stem portions 61, and extend in the direction rotated by a predetermined angle $\phi$ counterclockwise from the horizontal direction X. In the transparent electrodes 214, the branch portions 63 are formed only at the left side of the stem portions 61, and extend in the direction rotated by a predetermined angle $\phi$ clockwise from the horizontal direction X.

Further, in the transparent electrodes 221, the branch portions 63 are formed only at the right side of the stem portions 61, and extend in the direction rotated by a predetermined angle $\phi$ counterclockwise from the horizontal direction X in FIG. 25. In the transparent electrodes 222, the branch portions 63 are formed only at the left side of the stem portions 61, and extend in the direction rotated by a predetermined angle $\phi$ clockwise from the horizontal direction X. In the transparent electrodes 223, the branch portions 63 are formed only at the right side of the stem portions 61, and extend in the direction rotated by a predetermined angle $\phi$ clockwise from the horizontal direction X. In the transparent electrodes 224, the branch portions 63 are formed only at the left side of the stem portions 61, and extend in the direction rotated by a predetermined angle $\phi$ counterclockwise from the horizontal direction X.

The transparent electrodes 211 to 214 and 221 to 224 are disposed along the horizontal direction X in the order of 211, 221, 212, 222, 213, 223, 214, and 224, while being disposed repeatedly with these eight transparent electrodes as a unit U.

Figure 26:
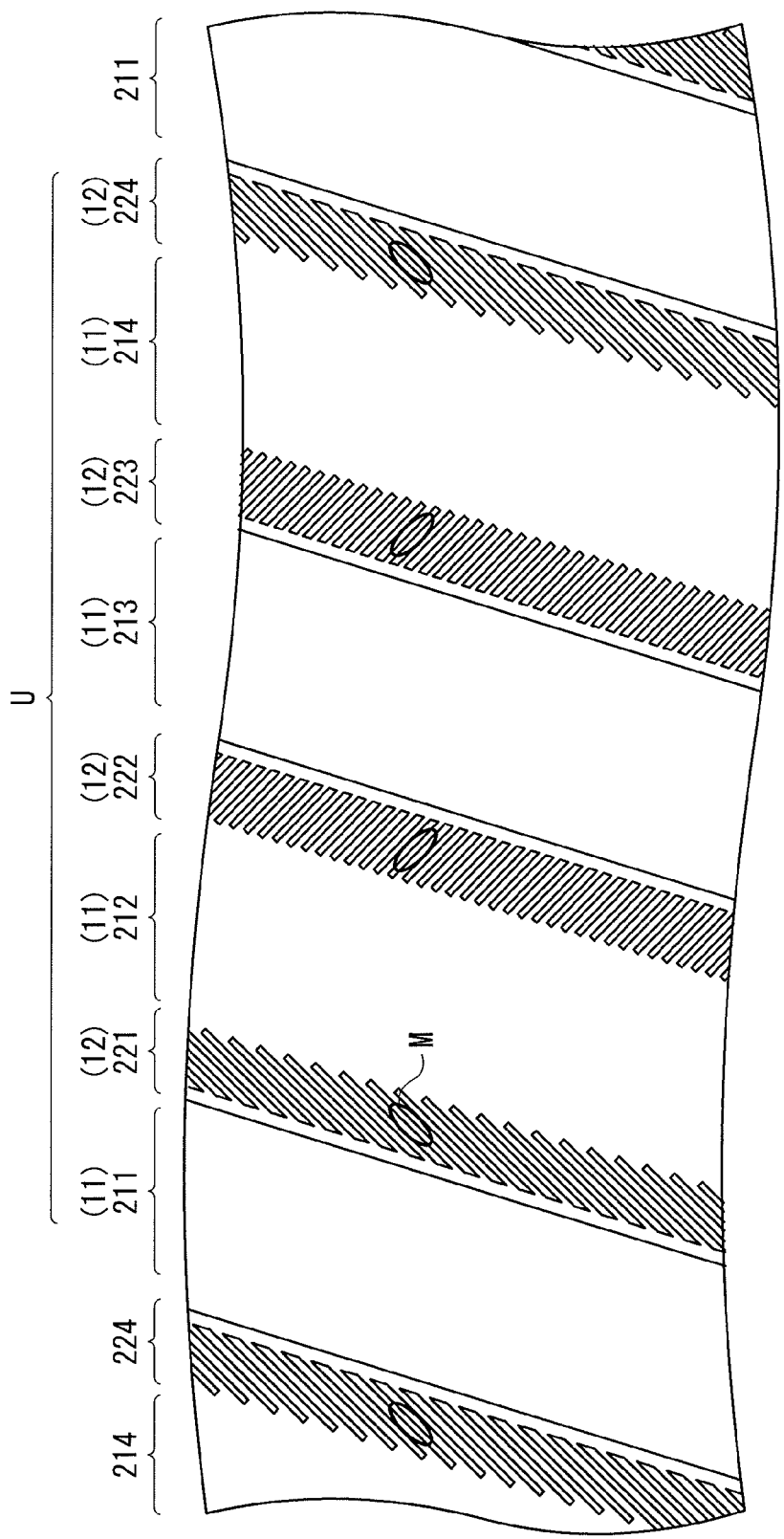
FIG. 26 is another plan view showing a configuration example of a transparent electrode according to a modification example of the second embodiment of the present disclosure.

FIG. 26 shows an electrode pattern of the opening-closing sections 12 related to a stereoscopic display in the stereoscopic display unit 2A. Also in this case, the alignment pattern of the liquid crystal molecules M in the opening-closing sections 12 is different from each other depending on a difference in the electrode pattern among the transparent electrodes 221 to 224, which allows to obtain the viewing angle characteristics symmetric relative to the right-and-left direction and the up-and-down direction.

The present technology is described hereto by citing several embodiments and modifications, although the present technology is not limited to those embodiments and the like, and a variety of modifications are available.

Figure 27A:
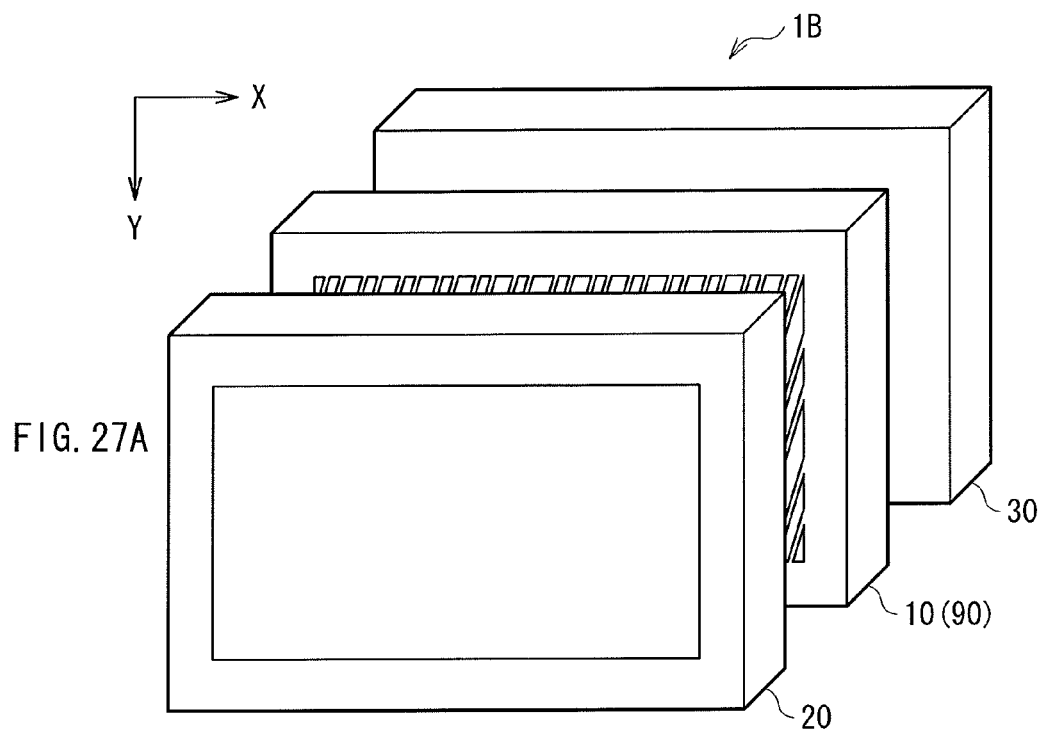
FIGS. 27A and 27B are each explanatory diagram showing a configuration example of a stereoscopic display unit according to a modification example.
Figure 27B:
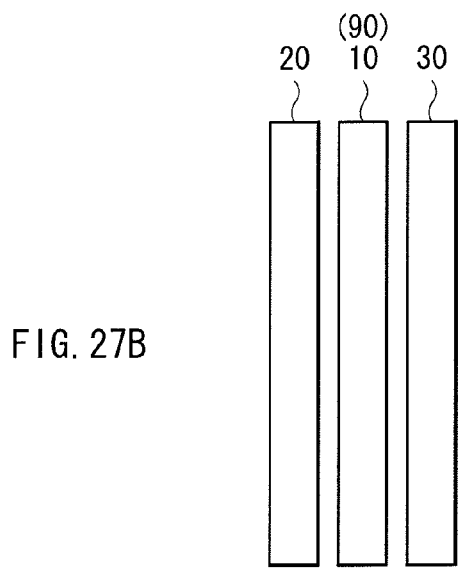

For example, in the above-described embodiments and the like, the backlight 30, the display section 20, and the liquid crystal barrier section 10 (90) in the stereoscopic display units 1 and 2 are disposed in this order, although the arrangement is not limited thereto. Alternatively, as shown in FIGS. 27A and 27B, the arrangement in the order of the backlight 30, the liquid crystal barrier section 10 (90), and the display section 20 is applicable.

FIGS. 28A and 28B show an operation example of the display section 20 and the liquid crystal barrier section 10 according to this modification example. FIG. 28A denotes a case where the image signal SA is provided, while FIG. 28B denotes a case where the image signal SB is provided. In this modification example, the light emitted from the backlight 30 enters the liquid crystal barrier section 10 (90) at first. Thereafter, the light transmitting through the opening-closing sections 12A and 12B among such light is modulated in the display section 20, and six perspective images is output.

Further, for example, in the above-described embodiments and the like, the opening-closing sections 12 compose two groups, although the configuration is not limited thereto. Alternatively, the opening-closing sections 12 may compose three or more groups. This allows the display resolution to be further improved. The detailed description will be provided hereinafter.

Figure 29A:
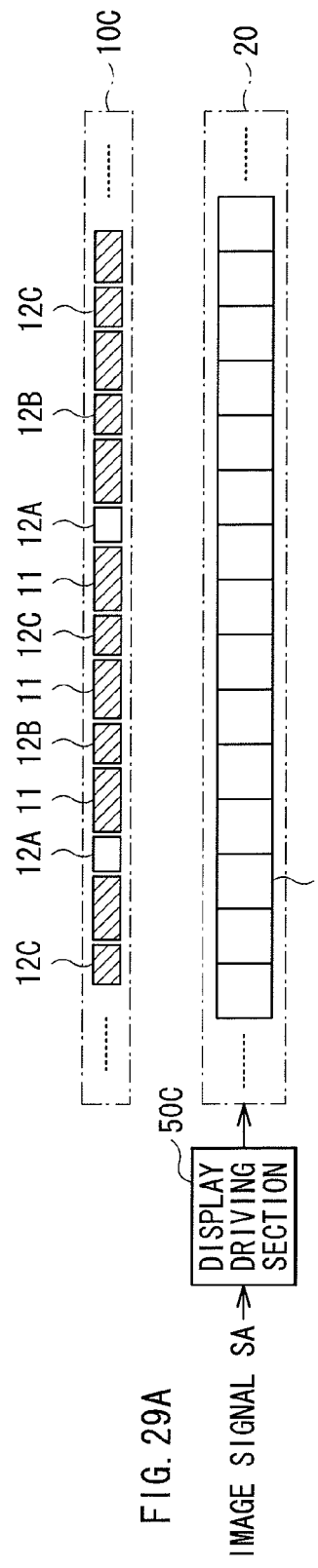
FIGS. 29A to 29C are each pattern diagram showing an operation example of a display section and a liquid crystal barrier section according to another modification example.
Figure 29B:
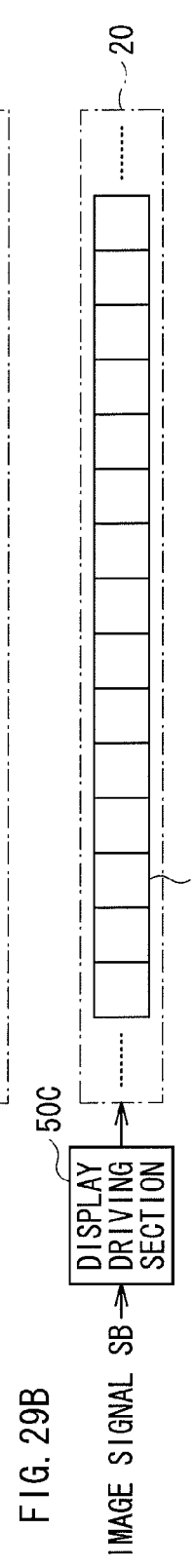
Figure 29C:
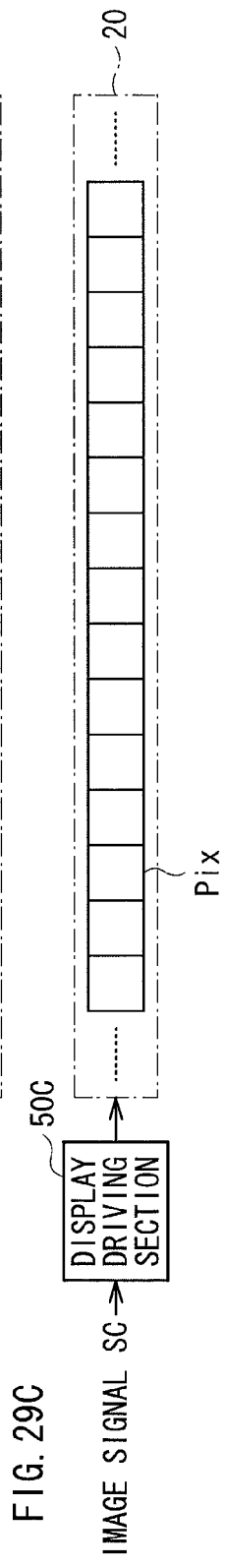

FIGS. 29A to 29C show a case where the opening-closing sections 12 compose three groups A, B, and C. As with the above-described embodiment, the opening-closing sections 12A indicate the opening-closing sections 12 belonging to the group A, the opening-closing sections 12B indicate the opening-closing sections 12 belonging to the group B, and the opening-closing sections 12C indicate the opening-closing sections 12 belonging to the group C.

With such an arrangement, by displaying images with the opening-closing sections 12A, 12B, and 12C open alternately on the time-division basis, the stereoscopic display unit according to this modification example is capable of achieving the resolution three times as high as a case where the opening-closing sections 12A are only provided. In other words, the resolution necessary for this stereoscopic display unit is a half ($=\frac{1}{6} \times 3$) as compared with a case of the two-dimensional display.

Figure 30:
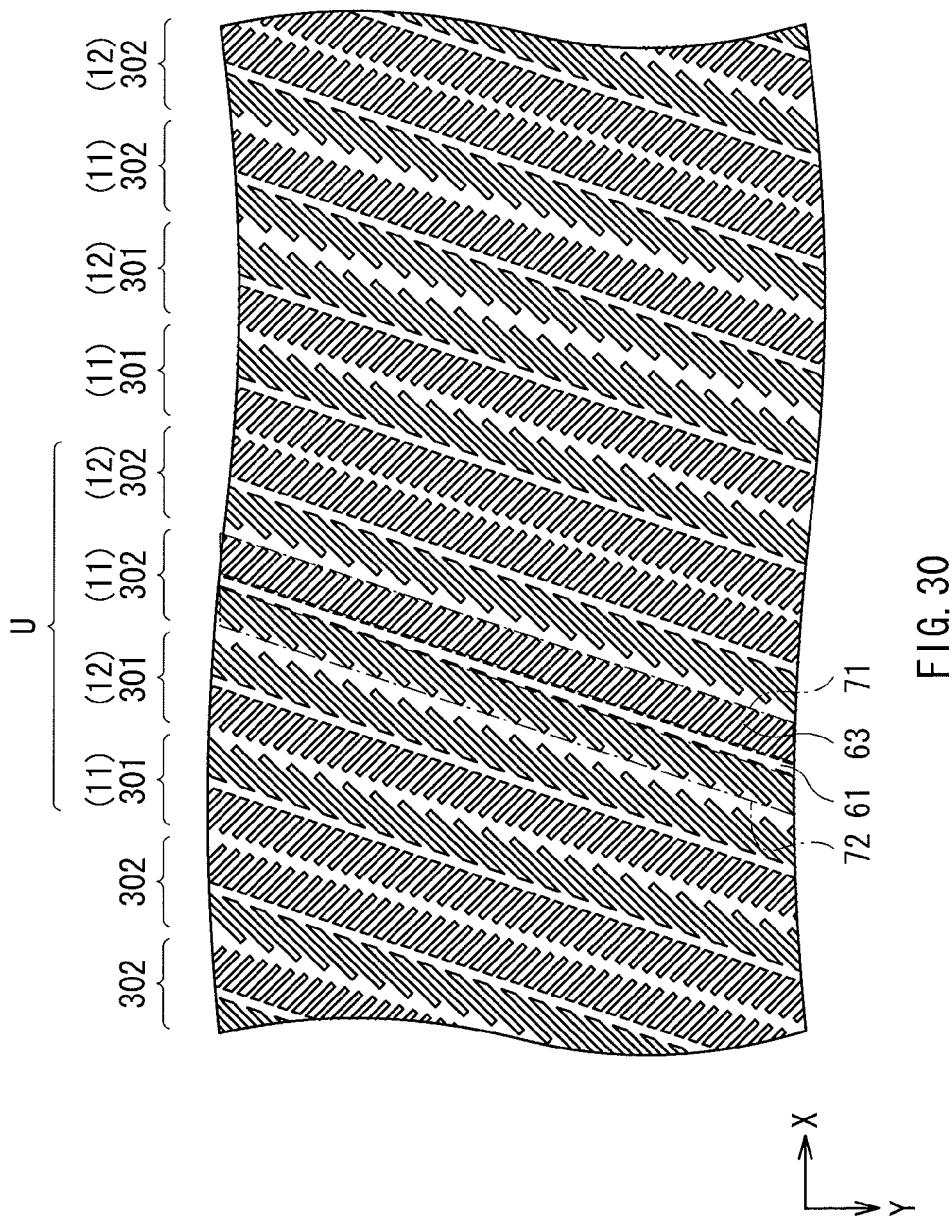
FIG. 30 is a plan view showing a configuration example of a transparent electrode according to another modification example.
Figure 31:
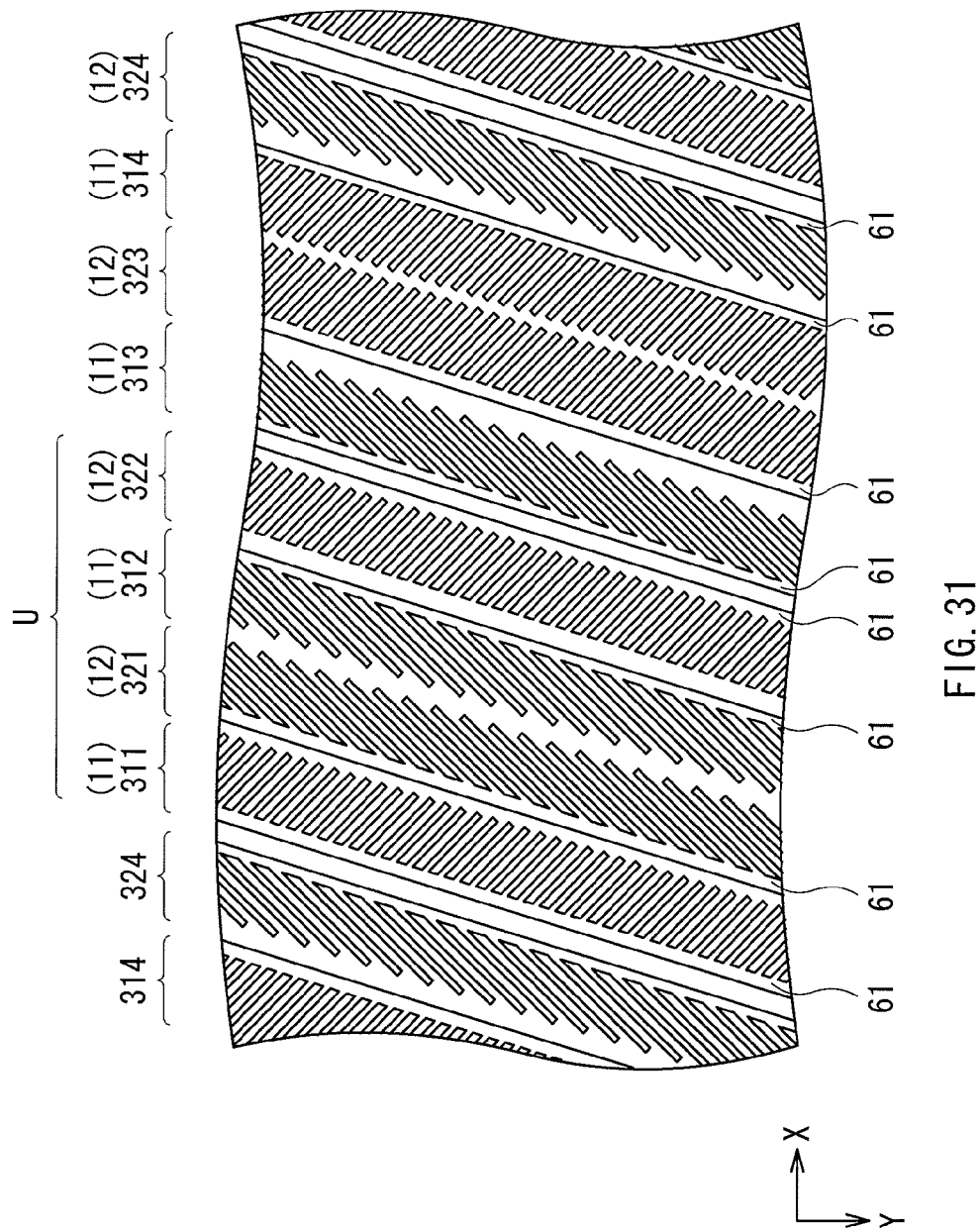
FIG. 31 is a plan view showing a configuration example of a transparent electrode according to another modification example.

Further, for example, in the above-described embodiments and the like, an illustration is predetermined in the figure as an example under the condition that a width E1 of the opening-closing section 11 is greater than a width E2 of the opening-closing section 12 (E1>E2), although the width magnitude relation is not limited thereto. Alternatively, the width E1 of the opening-closing section 11 may be equal to the width E2 of the opening-closing section 12 (E1=E2), or the width E1 of the opening-closing section 11 may be smaller than the width E2 of the opening-closing section 12 (E1<E2). FIG. 30 and FIG. 31 show examples of the case where the width E1 of the opening-closing section 11 is made equal to the width E2 of the opening-closing section 12 (E1=E2) in the stereoscopic display unit 2 according to the second embodiment and the stereoscopic display unit 2A according to the modification example thereof, respectively.

Moreover, for example, in the above-described embodiments and the like, the image signals SA and SB include six perspective images, although the signal assignment is not limited thereto. Alternatively, the image signals SA and SB may include five or less perspective images, or seven or more perspective images. In this case, a relationship between the opening-closing sections 12A and 12B in the liquid crystal barrier section 10 and the pixels Pix as shown in FIGS. 9A to 9C is also varied. That is, for example, when the image signals SA and SB include five perspective images, it is desirable to provide the opening-closing sections 12A at a rate of one piece per five pixels Pix of the display section 20, while similarly it is desirable to provide the opening-closing sections 12B at a rate of one piece per five pixels Pix of the display section 20 as well.

Additionally, for example, in the above-described embodiments and the like, the display section 20 is a liquid crystal display section, although the arrangement is not limited thereto. Alternatively, an EL (Electro Luminescence) display section using organic EL for example may be used. Such a case eliminates the backlight driving section 42 and the backlight 30 shown in FIG. 1.

Thus, it is possible to achieve at least the following configurations from the above-described example embodiments and the modifications of the disclosure.

(1) A display unit including:
a display section displaying an image; and
a liquid crystal barrier section having a plurality of liquid crystal barriers extending in a predetermined direction, each of the liquid crystal barriers including a liquid crystal layer and a barrier electrode to transmit and block light,
wherein the barrier electrode includes
a stem portion extending in the predetermined direction, and
a plurality of branch portions extending from the stem portion, and the liquid crystal barrier section includes one or more groups of the liquid crystal barriers, the one group of the liquid crystal barriers including the barrier electrodes with patterns different from each other.

(2) The display unit according to (1), wherein the liquid crystal barrier section includes first group of the liquid crystal barriers and second group of the liquid crystal barriers, where liquid crystal barriers in the same group include the barrier electrodes with patterns different from each other.

(3) The display unit according to (2), wherein the barrier electrode has a plurality of first branch portions and a plurality of second branch portions, the first and the second branch portions being formed on sides opposite to each other with respect to the stem portion, and the first branch portions extend in a direction different from an extending direction of the second branch portions.

(4) The display unit according to (3), wherein the first branch portions of the barrier electrode belonging to a predetermined number of adjacent liquid crystal barriers in the same group extend in the same direction, and the second branch portions of the barrier electrode belonging to a predetermined number of adjacent liquid crystal barriers in the same group extend in the same direction.

(5) The display unit according to (3), wherein the first branch portions of the barrier electrode belonging to one liquid crystal barrier of adjacent pair of liquid crystal barriers in the same group extend in a direction different from an extending direction of the first branch portions of the barrier electrode belonging to the other liquid crystal barrier, and the second branch portions of the barrier electrode belonging to one liquid crystal barrier of an adjacent pair of liquid crystal barriers in the same group extend in a direction different from an extending direction of the second branch portions of the barrier electrode belonging to the other liquid crystal barrier.
(6) The display unit according to (2), wherein the plurality of the branch portions extend in the same direction at either a first branch region or a second branch region, the first and the second branch regions being arranged on sides opposite to each other with respect to the stem portion.
(7) The display unit according to (6), wherein the branch portions of the barrier electrode belonging to one liquid crystal barrier of an adjacent pair of liquid crystal barriers in the same group are formed at a branch region different from a branch region in which the branch portions of the barrier electrode belonging to the other liquid crystal barrier are formed.
(8) The display unit according to (6), wherein the branch portions of the barrier electrode belonging to a predetermined number of adjacent liquid crystal barriers in the same group extend in the same direction.
(9) The display unit according to any one of (1) to (8) further comprising:
 a first polarizer provided at one side of the liquid crystal layer to transmit polarized light in one direction of the vertical direction and the horizontal direction within a display face in the display section; and
 a second polarizer provided on the opposite side of the side where the first polarizer is provided on the liquid crystal layer to transmit polarized light in the other direction of the vertical direction and the horizontal direction,
 wherein the plurality of the branch portions includes branch portions extending in a direction inclined at about 45 degrees clockwise from the horizontal direction and branch portions extending in a direction inclined at about 45 degrees counterclockwise from the horizontal direction.
(10) The display unit according to any one of (1) to (9), wherein the predetermined direction is a direction different from both of the vertical direction and the horizontal direction within a display face on the display section.
(11) The display unit according to any one of (2) to (8) having a plurality of display modes including three-dimensional image display mode and two-dimensional image display mode,
 wherein in the three-dimensional image display mode, the display section displays a plurality of different perspective images, and the first group of the liquid crystal barriers are in a transmitting state, and the second group of the liquid crystal barriers are in a blocking state, thereby displaying three-dimensional images, and
 in the two-dimensional image display mode, the display section displays a single perspective image, and the first group of and the second group of the liquid crystal barriers are in a transmitting state, thereby displaying two-dimensional images.
(12) The display unit according to (11), wherein the first group of the liquid crystal barriers is grouped into a plurality of barrier sub-groups, and in the three-dimensional image display mode, the first group of the liquid crystal barriers is switched between a transmitting state and a blocking state on the time-division basis for each barrier sub-group.
(13) The display unit according to any one of (1) to (12), wherein the display section is a liquid crystal display section, further includes a backlight, and the liquid crystal display section is disposed between the backlight and the liquid crystal barrier section.
(14) The display unit according to any one of (1) to (12), wherein the display section is a liquid crystal display section, further includes a backlight, and the liquid crystal barrier section is disposed between the backlight and the liquid crystal display section.
(15) The display unit according to (3), wherein the extending direction of the first branch portion and the extending direction of the second branch portion are inclined at about 45 degrees with respect to the horizontal direction.
(16) A barrier device disposed apart from a display face of a display section displaying images and including a plurality of liquid crystal barriers extending in a predetermined direction, each of the liquid crystal barriers including a liquid crystal layer and a barrier electrode to transmit and block light,
 wherein the barrier electrode includes
 a stem portion extending in the predetermined direction, and
 a plurality of branch portions extending from the stem portion, and the liquid crystal barrier includes one or more groups of the liquid crystal barriers, the one group of the liquid crystal barriers including the barrier electrodes with patterns different from each other.

The present disclosure contains subject matter related to that disclosed in Japanese Priority Patent Application JP 2011-094164 filed in the Japan Patent Office on Apr. 20, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display unit comprising:
 a display section displaying an image; and
 a liquid crystal barrier section having a plurality of liquid crystal barriers extending in a predetermined direction, each of the liquid crystal barriers including a liquid crystal layer and a barrier electrode to transmit and block light,
 wherein:
 each barrier electrode includes
 a stem portion extending in the predetermined direction, and
 a plurality of branch portions extending from the stem portion, and
 the liquid crystal barrier section includes one or more groups of the liquid crystal barriers, the one or more groups comprising a first group, the first group of the liquid crystal barriers including barrier electrodes with patterns different from each other.

2. The display unit according to claim 1, wherein the one or more groups of the liquid crystal barrier section includes the first group of the liquid crystal barriers and a second group of the liquid crystal barriers, where liquid crystal barriers within a group include barrier electrodes with patterns different from each other.

3. The display unit according to claim 2, wherein at least one barrier electrode of the liquid crystal barrier section has a plurality of first branch portions and a plurality of second branch portions, the first and the second branch portions being formed on sides opposite to each other with respect to the stem portion, and the first branch portions extend in a direction different from an extending direction of the second branch portions.

4. The display unit according to claim 3, wherein:
the at least one barrier electrode is a plurality of barrier electrodes;
the plurality of barrier electrodes are barrier electrodes of a plurality of liquid crystal barriers that are adjacent to one another in a same group of the one or more groups; and
the first branch portions of the plurality of barrier electrodes extend in a first same direction and the second branch portions extend in a second same direction.

5. The display unit according to claim 3, wherein:
the at least one barrier electrode is a plurality of barrier electrodes;
the plurality of barrier electrodes are barrier electrodes of a plurality of liquid crystal barriers that are adjacent to one another in a same group of the one or more groups;
the plurality of liquid crystal barriers comprise a first liquid crystal barrier and a second liquid crystal barrier, the first liquid crystal barrier and the second liquid crystal barrier being adjacent and being in a same group of the one or more groups;
the first branch portions of the barrier electrode belonging to the first liquid crystal barrier extend in a direction different from an extending direction of the first branch portions of the barrier electrode belonging to the second liquid crystal barrier; and
the second branch portions of the barrier electrode belonging to the first liquid crystal barrier extend in a direction different from an extending direction of the second branch portions of the barrier electrode belonging to the second liquid crystal barrier.

6. The display unit according to claim 3, wherein the extending direction of the first branch portion and the extending direction of the second branch portion are inclined at about 45 degrees with respect to the horizontal direction.

7. The display unit according to claim 2, wherein the plurality of the branch portions of at least one barrier electrode extend in a same direction at either a first branch region or a second branch region, the first and the second branch regions being arranged on sides opposite to each other with respect to the stem portion.

8. The display unit according to claim 7, wherein the branch portions of the barrier electrode belonging to a first liquid crystal barrier are formed at a branch region different from a branch region in which the branch portions of the barrier electrode belonging to a second liquid crystal barrier are formed, the first and second liquid crystal barriers being adjacent in a same group of the one or more groups.

9. The display unit according to claim 7, wherein branch portions of barrier electrodes belonging to a number of adjacent liquid crystal barriers in a same group extend in the same direction.

10. The display unit according to claim 2, having a plurality of display modes including a three-dimensional image display mode and a two-dimensional image display mode,
wherein in the three-dimensional image display mode, the display section displays a plurality of different perspective images, and the first group of the liquid crystal barriers are in a transmitting state and the second group of the liquid crystal barriers are in a blocking state, thereby displaying three-dimensional images, and
in the two-dimensional image display mode, the display section displays a single perspective image, and the first group of and the second group of the liquid crystal barriers are in a transmitting state, thereby displaying two-dimensional images.

11. The display unit according to claim 10, wherein the first group of the liquid crystal barriers is grouped into a plurality of barrier sub-groups, and in the three-dimensional image display mode, the first group of the liquid crystal barriers is switched between a transmitting state and a blocking state on a time-division basis for each barrier sub-group.

12. The display unit according to claim 1 further comprising:
a first polarizer, provided at one side of the liquid crystal layer, to transmit polarized light in one of a vertical direction and a horizontal direction within a display face in the display section; and
a second polarizer, provided on an opposite side of the one side where the first polarizer is provided on the liquid crystal layer, to transmit polarized light in the other direction of the vertical direction and the horizontal direction,
wherein the plurality of the branch portions of at least one barrier electrode includes branch portions extending in a direction inclined at about 45 degrees clockwise from the horizontal direction and branch portions extending in a direction inclined at about 45 degrees counterclockwise from the horizontal direction.

13. The display unit according to claim 1, wherein the predetermined direction is a direction different from both of a vertical direction and a horizontal direction within a display face on the display section.

14. The display unit according to claim 1, wherein:
the display section is a liquid crystal display section,
the display section further includes a backlight, and
the liquid crystal display section is disposed between the backlight and the liquid crystal barrier section.

15. The display unit according to claim 1, wherein:
the display section is a liquid crystal display section,
the display section further includes a backlight, and
the liquid crystal barrier section is disposed between the backlight and the liquid crystal display section.

16. A barrier device disposed apart from a display face of a display section displaying images and including a plurality of liquid crystal barriers extending in a predetermined direction, each of the liquid crystal barriers including a liquid crystal layer and a barrier electrode to transmit and block light,
wherein:
each barrier electrode includes:
a stem portion extending in the predetermined direction, and
a plurality of branch portions extending from the stem portion, and
the liquid crystal barrier includes one or more groups of the liquid crystal barriers, the one or more groups comprising a first group, the first group of the liquid crystal barriers including barrier electrodes with patterns different from each other.

* * * * *